US012769353B2

(12) United States Patent
Suzuki et al.

(10) Patent No.: US 12,769,353 B2
(45) Date of Patent: Oct. 20, 2026

(54) PEDAL DEVICE

(71) Applicant: DENSO CORPORATION, Kariya-city (JP)

(72) Inventors: Genki Suzuki, Kariya-city (JP); Etsugo Yanagida, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 19/206,554

(22) Filed: May 13, 2025

(65) Prior Publication Data

US 2025/0271892 A1 Aug. 28, 2025

Related U.S. Application Data

(63) Continuation of application No. PCT/JP2023/039718, filed on Nov. 2, 2023.

(30) Foreign Application Priority Data

Nov. 30, 2022 (JP) ................................ 2022-191753

(51) Int. Cl.

| | |
|---|---|
| ***G05G 5/05*** | (2006.01) |
| ***B60K 26/02*** | (2006.01) |
| ***B60T 7/06*** | (2006.01) |
| ***G05G 1/38*** | (2008.04) |
| ***G05G 1/44*** | (2008.04) |

(52) U.S. Cl.

CPC .................. *G05G 5/05* (2013.01); *B60T 7/06* (2013.01); *G05G 1/44* (2013.01); *B60K 26/021* (2013.01); *G05G 1/38* (2013.01); *G05G 2505/00* (2013.01)

(58) Field of Classification Search

CPC .. G05G 1/30; G05G 1/38; G05G 1/44; G05G 5/03; G05G 5/05; G05G 2505/00; B60K 26/021; B60T 7/06

See application file for complete search history.

(56) References Cited

U.S. PATENT DOCUMENTS

| | | | | |
|---|---|---|---|---|
| 4,454,497 A * | 6/1984 | Morse | ..................... | B60T 15/00 74/478.5 |
| 10,248,152 B2 * | 4/2019 | Kim | ......................... | G05G 5/05 |

(Continued)

FOREIGN PATENT DOCUMENTS

| | | | |
|---|---|---|---|
| CN | 115303237 A * | 11/2022 | ............. B60K 26/02 |
| EP | 3031653 A1 | 6/2016 | |

(Continued)

*Primary Examiner* — Adam D Rogers

(74) *Attorney, Agent, or Firm* — Nixon & Vanderhye P.C.

(57) ABSTRACT

A pedal device has a pedal to receive stepping force of a driver. The pedal is located above a housing. The housing accommodates a stepping force transmission member. The pedal and the stepping force transmission member are connected by a connection member which extends through an insertion hole penetrating the housing. An inner opening of the insertion hole faces downward or obliquely downward in a predetermined state in which the pedal device is stored or mounted on a vehicle. The insertion hole is positioned so that the inner opening end does not overlap with movable member in the housing. The movable member may include a sliding member such as a part of a rotation angle sensor, a slidable member, and a member of a reaction force generator mechanism.

19 Claims, 22 Drawing Sheets

(56) References Cited

U.S. PATENT DOCUMENTS

| | | | | |
|---|---|---|---|---|
| 10,739,810 | B2 * | 8/2020 | Nagashima | B60K 26/02 |
| 11,077,752 | B2 * | 8/2021 | Kim | G05G 5/05 |
| 11,225,141 | B2 | 1/2022 | Ridder et al. | |
| 11,584,226 | B2 * | 2/2023 | Kita | G05G 1/30 |
| 12,194,847 | B2 * | 1/2025 | Kihara | G05G 1/30 |
| 12,269,452 | B2 * | 4/2025 | Hokuto | B60T 7/06 |
| 2007/0193401 | A1 | 8/2007 | Campbell | |
| 2021/0237569 | A1 | 8/2021 | Ridder et al. | |
| 2021/0294371 | A1 | 9/2021 | Kihara et al. | |
| 2024/0069587 | A1 | 2/2024 | Fukuda et al. | |

FOREIGN PATENT DOCUMENTS

| | | | | | |
|---|---|---|---|---|---|
| JP | 2017049892 | A | | 3/2017 | |
| JP | 2020100173 | A | * | 7/2020 | B60K 26/02 |
| JP | 2022175963 | A | * | 11/2022 | B60T 8/17 |

* cited by examiner

PEDAL DEVICE

CROSS REFERENCE TO RELATED APPLICATION

The present application is a continuation application of International Patent Application No. PCT/JP2023/039718 filed on Nov. 2, 2023, which designated the U.S. and is based on and claims the benefit of priority from Japanese Patent Application No. 2022-191753 filed on Nov. 30, 2022, the contents of which are incorporated herein by reference.

TECHNICAL FIELD

The present disclosure relates to a pedal device for a vehicle.

BACKGROUND

According to a conventional pedal device, a pedal is operated with a foot of a driver. Since some movable members are located below the pedal, therefore the pedal device may be damaged with a water and foreign matters. In the above aspects, or in other aspects not mentioned, there is a need for further improvements in a pedal device.

SUMMARY OF THE INVENTION

A pedal device according to one aspect of the present disclosure is an organ-type pedal device to be mounted in a vehicle, comprising:

a housing;

a pedal connected to the housing so as to be able to swing about a pedal axis as a center and positioned to be operated by stepping motion of a driver from a side opposite to the housing;

a reaction force generator mechanism that is disposed within the housing and includes an elastic member that generates a reaction force against a stepping force applied to the pedal by a driver in response to a swing motion of the pedal;

a stepping force transmission member that is disposed within the housing, is connected to the reaction force generator mechanism, and deflects the elastic body by the stepping force received from the pedal; and a connection member that connects the pedal and the stepping force transmission member so that the pedal and the stepping force transmission member move integrally, wherein the housing has an insertion hole through which the connection portion is inserted, and wherein the insertion hole has an inner opening end that opens toward an inside of the housing, and wherein the inner open end faces downward or obliquely downward in a predetermined state in which the pedal device is stored or mounted on a vehicle, and wherein the insertion hole is arranged so that an opening end lower area obtained by extending an inner opening end downward along a predetermined state up-and-down direction, which is an up-and-down direction in the predetermined state, does not overlap with a sensor, a sliding portion where members slide against each other as the pedal swings, and a mechanism-specific portion where members of the reaction force generator mechanism adjacent via a gap are displaced against each other as the pedal swings.

According to this configuration, even if the sensor is disposed in the housing, foreign matter or the like that entering into the housing through the insertion hole is unlikely to reach the sensor. The same may be applied to the cases where the sliding portion is disposed inside the housing and where the mechanism-specific portion is disposed inside the housing.

Therefore, regardless of whether the above-mentioned sensor, sliding portions, or a mechanism-specific portion is disposed in the housing, defects such as excessive wear and sticking between parts may be prevented from occurring due to foreign matter entering the housing.

In addition, in some part of the application document, some elements may be provided with reference symbols in parentheses. In this case, the reference symbol merely indicates an example of correspondence between the element and the specific configuration of the embodiment described later. Therefore, the present disclosure is not limited by the configurations indicated by the reference symbols.

DETAILED DESCRIPTION

Figure 1:
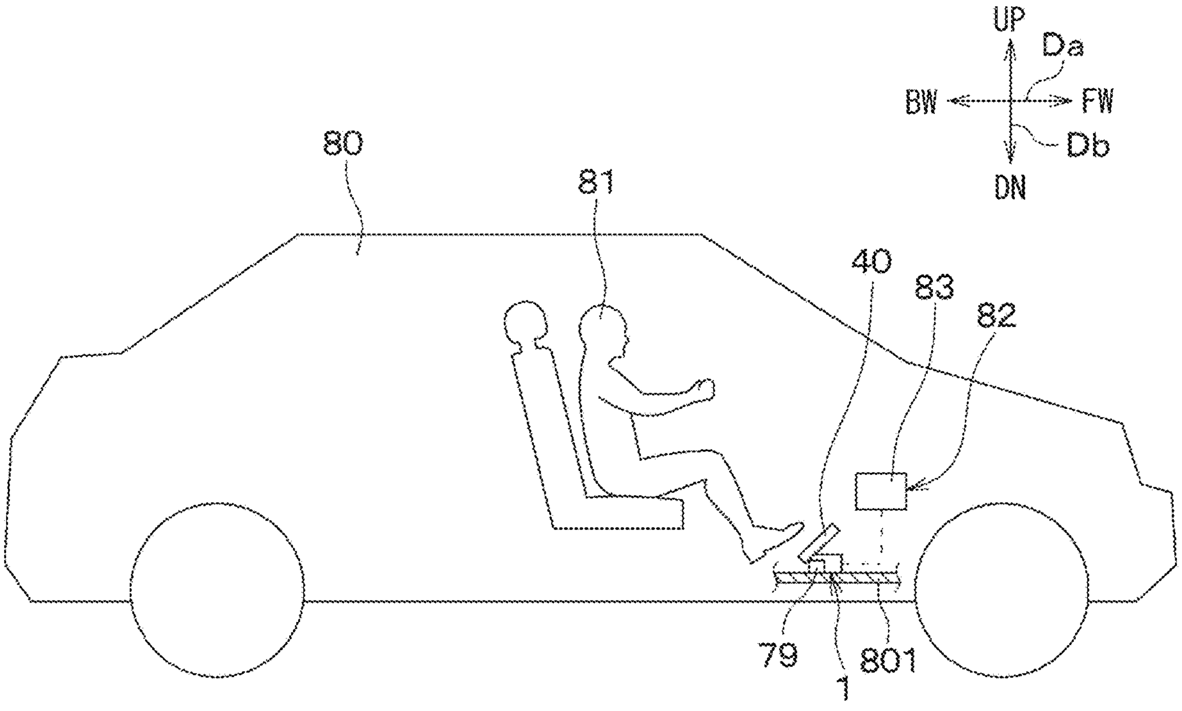
FIG. 1 is a schematic diagram illustrating a vehicle on which a pedal device is mounted according to a first embodiment.

Hereinafter, embodiments are described with reference to the drawings. In the following embodiments, the same or equivalent parts are denoted by the same reference numerals in the drawings.

As this type of pedal device, a pedal device described in, e.g., WO2019/210945A1 is conventionally known. The pedal device described in this patent literature is an organ-type pedal device. The pedal device includes a pedal that is operated by stepping motion of a driver, a housing that supports the pedal in a swingable manner, a return spring contained within the housing, a rocker arm that presses the return spring, and a power transmission element.

The power transmission element transmits a stepping force which the driver applied to the pedal from the pedal to the rocker arm. Therefore, the power transmission element is connected to both the pedal and the rocker arm in a rotatable manner while being inserted into an insertion hole formed in the housing. The power transmission element and the rocker arm come into sliding contact with each other in response to the swing motion of the pedal at a connection portion between the power transmission element and the rocker arm, and the connection portion is located directly below the insertion hole of the housing in a vehicle-mounted state.

As described above, in the pedal device of WO2019/210945A1, the sliding portion where the power transmission element and the rocker arm make sliding contact with each other (i.e., a connection portion between the power transmission element and the rocker arm) is located directly below the insertion hole of the housing. Therefore, foreign matter or water entering the housing through the insertion hole can easily reach the sliding portion. If foreign matter or water adheres to the sliding portions, there is a high possibility that problems such as excessive wear or adhesion of parts at the sliding parts occur. The above has been found as a result of detailed studies by the inventors.

In view of the above, an object of the present disclosure is to provide a pedal device capable of suppressing malfunctions caused by foreign matter or the like entering into a housing.

First Embodiment

As illustrated in FIG. 1, the pedal device 1 of the present embodiment is a device mounted on a vehicle 80, and is subjected to be operated by stepping motion by stepping force of a driver 81 who is an occupant of the vehicle 80. The pedal device 1 is disposed in the vehicle 80 as a brake pedal device for performing a braking operation of braking the vehicle 80.

More specifically, a brake-by-wire system 82 is adopted in the vehicle 80 of FIG. 1, and the pedal device 1 is a brake pedal device used in the brake-by-wire system 82. The brake-by-wire system 82 is a system that drives a brake pad of each wheel via a brake circuit by a fluid pressure generated in a master cylinder by a drive control of an electronic control unit 83 mounted on the vehicle 80 on the basis of an electrical signal output from the pedal device 1.

The electronic control unit 83 has a configuration as an in-vehicle microcomputer having a CPU, RAM, ROM, nonvolatile rewritable memory, etc., not shown. That is, the electronic control unit 83 loads and executes a computer program stored in the ROM or the non-volatile rewritable memory that is a non-transitory tangible recording medium. By executing this computer program, a method corresponding to the computer program is performed.

Figure 3:
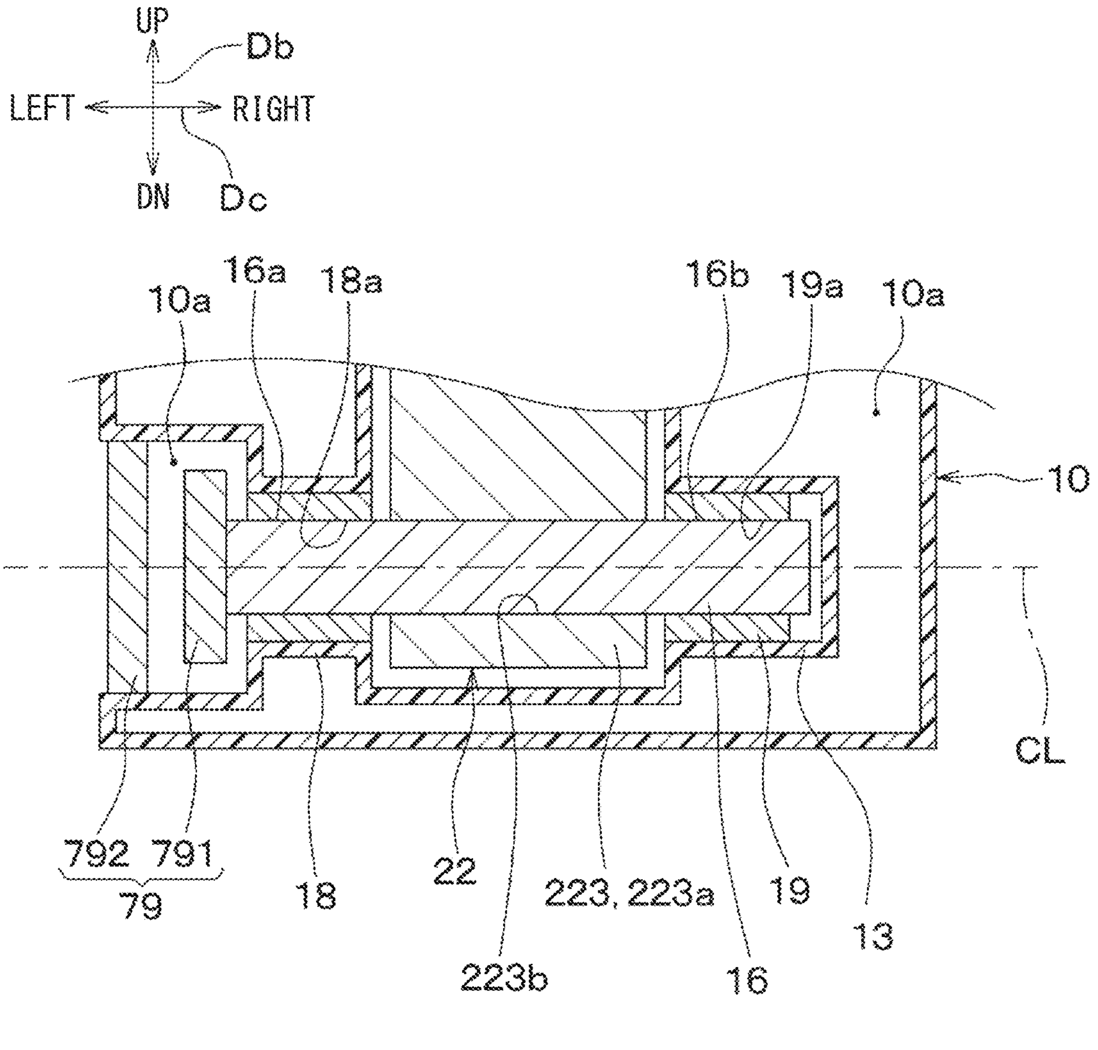
FIG. 3 is a cross-sectional view schematically illustrating a cross-sectional view on a line III-III of FIG. 2 in the first embodiment.

Each of double-ended arrows in FIG. 1 and FIG. 3 indicates a direction of the vehicle 80 on which the pedal device 1 is mounted. That is, a vehicle forward-and-backward direction Da, which is a forward-and-backward direction of the vehicle 80, a vehicle up-and-down direction Db, which is an up-and-down direction of the vehicle 80, and the vehicle width direction Dc, which is a width direction of the vehicle 80 (in other words, a left-and-right direction of the vehicle 80), are each indicated by arrows at both ends. These directions Da, Db and Dc are directions which cross each other, and are, strictly speaking, directions which are perpendicular to each other.

In addition, in the description of this embodiment, a forward side in the vehicle forward-and-backward direction Da may be also referred to as a front side in the vehicle direction, and a backward side in the vehicle forward-and-backward direction Da may be also referred to as a rear side in the vehicle direction. In addition, an upper side in the vehicle up-and-down direction Db is also referred to as a vehicle upper direction side, and a downside in the vehicle up-and-down direction Db is also referred to as a vehicle down direction side.

Figure 2:
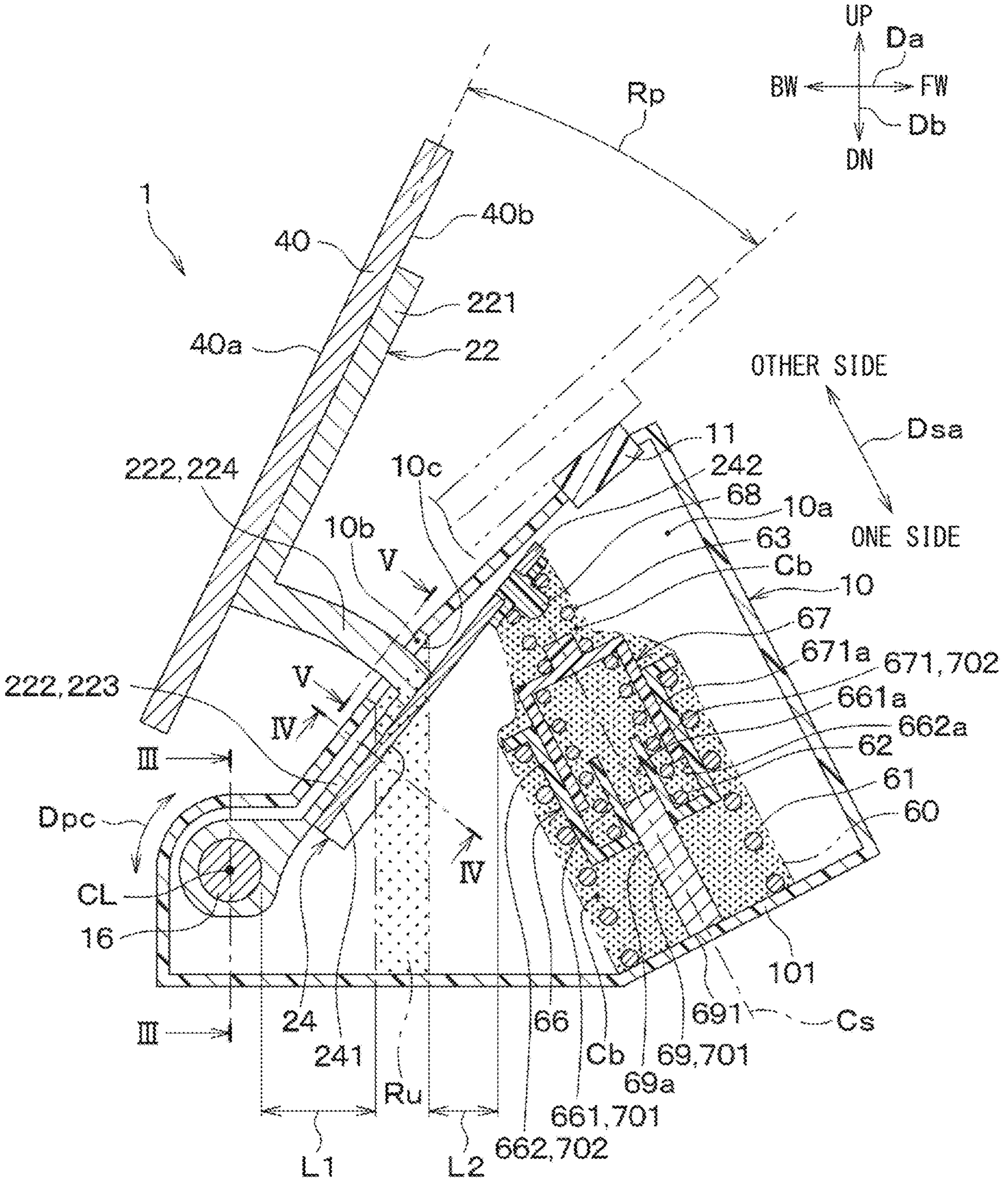
FIG. 2 is a cross-sectional view of the first embodiment, illustrating a schematic configuration of the pedal device in a non-stepping motion state of a pedal, in a posture of a vehicle-mounted state, and is a cross-sectional view illustrating the pedal device in a cross-sectional view perpendicular to a pedal axis of the pedal device.

As shown in FIGS. 1 to 3, the pedal device 1 includes a housing 10, a rotation shaft 16, bearings 18, 19, a connection member 22, a transmission member 24, a pedal 40, a reaction force generator mechanism 60, a rotation angle sensor 79, and the like. The pedal device 1 is an organ-type pedal device. In addition, in FIG. 2 and subsequent drawings corresponding to FIG. 2, the reaction force generator mechanism 60 is indicated by dotted hatching.

The organ-type pedal device 1 refers to a configuration in which a portion of a pedal 40 of the pedal device 1 that is stepped by the driver 81 is positioned above a vehicle direction (in other words, above in the vehicle up-and-down direction in the vehicle-mounted state) with respect to a swing center CL of the pedal 40. In the organ-type pedal device 1, the pedal 40 swings so that an upper end of the pedal 40 in the vehicle direction is displaced downward or forward in the vehicle direction as stepping force applied to the pedal 40 by the driver 81 increases. The swing center CL of the pedal 40 is a center of rotation of the pedal 40 in its swing motion. In addition, in the description of this embodiment, a swing center CL of the pedal 40 is also referred to as a pedal axis CL. An axial direction of this pedal axis CL coincides with the vehicle width direction Dc.

The housing 10 is fixed to a part of the vehicle body 801 (for example, a floor or a dash panel) in a vehicle-mounted state in which the pedal device 1 is mounted on the vehicle 80. That is, the vehicle-mounted state also refers to a state in which the housing 10 is fixed to the vehicle 80. That is, the housing 10 is a non-rotatable member that is fixed to the vehicle body 801 and does not rotate. For example, the housing 10 is fixed to a part of the vehicle body 801 by bolting or the like.

A floor, which is a part of the vehicle body 801, constitutes a floor of the vehicle compartment, and a dash panel is a partition wall that partitions an inside of the vehicle 80 from an outside of the vehicle compartment, such as the engine room. In addition, the above-mentioned vehicle forward-and-backward direction Da is also a forward-and-backward direction of the pedal device 1 in the vehicle-mounted state, the vehicle up-and-down direction Db is also an up-and-down direction of the pedal device 1 in the vehicle-mounted state, and the vehicle width direction Dc is also a width direction of the pedal device 1 in the vehicle-mounted state.

The housing 10 is composed of, e.g., one or more components, and functions as a support member for supporting the pedal 40 and the reaction force generator mechanism 60, etc. The housing 10 is, i.e., a case, and a housing cavity 10*a* is formed inside the housing 10 as an internal space. In this embodiment, the rotation shaft 16, bearings 18, and 19, a part of the connection member 22, the transmission member 24, the reaction force generator mechanism 60, a rotation angle sensor 79, and the like are arranged within the housing cavity 10*a*.

The housing 10 also has an insertion hole 10*b* formed therein, through which a connecting portion 222 of the connection member 22 (described later) is inserted. The insertion hole 10*b* is formed as a through-hole penetrating a part of an outer wall of the housing 10 that covers the housing cavity 10*a* on the upper side in the vehicle direction. The insertion hole 10*b* has an inner opening end 10*c* that opens toward an inside of the housing 10. The inner opening end 10*c* faces diagonally downward in the vehicle direction and is open to the housing cavity 10*a*.

The rotation shaft 16 is composed of a shaft member that has the pedal axis CL as its center and extends in the axial direction of the pedal axis CL. The rotation shaft 16 is inserted into a rotation shaft support portion 13 in a cylindrical shape that is integrally fixed to the housing 10, and is supported by the rotation shaft support portion 13 in a rotatable manner about the pedal axis CL. That is, the rotation shaft 16 is supported with respect to the housing 10 in a rotatable manner, i.e., in a swingable manner. In addition, since the rotation shaft 16 is connected to the pedal 40 by the connection member 22, the rotation shaft 16 rotates integrally with the pedal 40 about the pedal axis CL as a center as the pedal 40 swings. Therefore, the rotation shaft 16 functions as a pedal support portion for supporting the pedal 40 with respect to the housing 10 in a rotatable manner.

In detail, a pair of bearings 18 and 19 are fitted inside the rotation shaft support portion 13, and the bearings 18 and 19 are arranged side by side with a gap therebetween in the axial direction of the pedal axis CL. The rotation shaft 16 is fitted inside the pair of bearings 18 and 19, and is supported by the rotation shaft support portion 13 via the bearings 18 and 19 in a rotatable manner.

Therefore, the bearings 18 and 19 have bearing sliding surfaces 18*a* and 19*a*, which are sliding surfaces formed on insides of the bearings 18 and 19, respectively. The rotation shaft 16 has rotation shaft sliding surfaces 16*a* and 16*b* which are sliding surfaces that slide opposite to the bearing sliding surfaces 18*a* and 19*a*. These bearing sliding surfaces 18*a* and 19*a* and the rotation shaft sliding surfaces 16*a* and 16*b* respectively correspond to sliding portions where parts slide against each other as the pedal 40 swings.

The rotation angle sensor 79 is a type of sensor that detects a physical quantity related to the swing motion of the pedal 40, and specifically, is a sensor that detects the rotation angle of the rotation shaft 16. That is, the rotation angle sensor 79 detects the rotation angle of the rotation shaft 16, and outputs an electric signal indicating the rotation angle of the rotation shaft 16 to the electronic control device 83 (see FIG. 1). Since the pedal 40 and the rotation shaft 16 are fixed to each other and rotate integrally, the rotation angle of the rotation shaft 16 is the same as the rotation angle of the pedal 40. In this embodiment, the rotation angle sensor 79 is attached to the rotation shaft support portion 13.

For example, a contact type sensor may be used as the rotation angle sensor 79, but in this embodiment, a non-contact type sensor using a Hall IC or a magnetic resistance element is used. Therefore, the rotation angle sensor 79 has a detectable member 791 that is fixed to the rotation shaft 16 and rotates integrally with the rotation shaft 16, and a sensor member 792 that includes an electrical element that outputs an electrical signal corresponding to the rotation angle of the detectable member 791. The sensor member 792 is fixed to the rotation shaft support portion 13.

The connection member 22 has a pedal attachment portion 221 and a connecting portion 222 that are integrally formed. The connection member 22 transmits stepping force from the driver 81 and supports the pedal 40, therefore is made of a highly rigid metal or resin.

The pedal attachment portion 221 is fixed, e.g., by bolts, to a pedal back surface 40*b* of the pedal 40, which is a surface opposite to a stepping surface 40*a* that receives a stepping force from the driver 81.

The connecting portion 222 extends from the pedal attachment portion 221. The connecting portion 222 is interposed between the pedal 40 and the transmission member 24 and connect the pedal 40 and the transmission member 24 through the insertion hole 10*b* of the housing 10. As described above, the pedal 40 and the transmission member 24 move together. In detail, the pedal 40 and the transmission member 24 rotate integrally around the pedal axis CL. For example, the connecting portion 222 is fixed to the transmission member 24 by welding, bolting, or the like.

In addition, the connecting portion 222 is also interposed between the pedal 40 and the rotation shaft 16 and connect the pedal 40 and the rotation shaft 16. As a result, the pedal 40 and the rotation shaft 16 rotate integrally about the pedal axis CL. In short, the pedal 40, the connection member 22, the rotation shaft 16 and the transmission member 24 are fixed to one another and rotate integrally about the pedal axis CL.

In detail, the connecting portion 222 has an accommodated portion 223 disposed within the housing cavity 10*a* and an arc-shaped portion 224 that connects the accommodated portion 223 and the pedal attachment portion 221.

The accommodated portion 223 is disposed within the housing cavity 10*a* regardless of positions of the pedal 40 within a movable range Rp of the pedal 40. A through hole 223*b* is formed in one end 223*a* of the accommodated portion 223, and the rotation shaft 16 is fixed to the one end 223*a* of the accommodated portion 223 in a state where it is fitted into the through hole 223*b*. The accommodated portion 223 has an end portion located on the opposite side to the one end portion 223*a* of the accommodated portion 223, and the other end portion is connected to the arc-shaped portion 224. If it is a non-stepping motion state (in other words, a released state) in which the driver 81 does not perform stepping motion to the pedal 40, the other end of the accommodated portion 223 is located forward and above the one end 223*a* in the vehicle direction.

Figure 4:
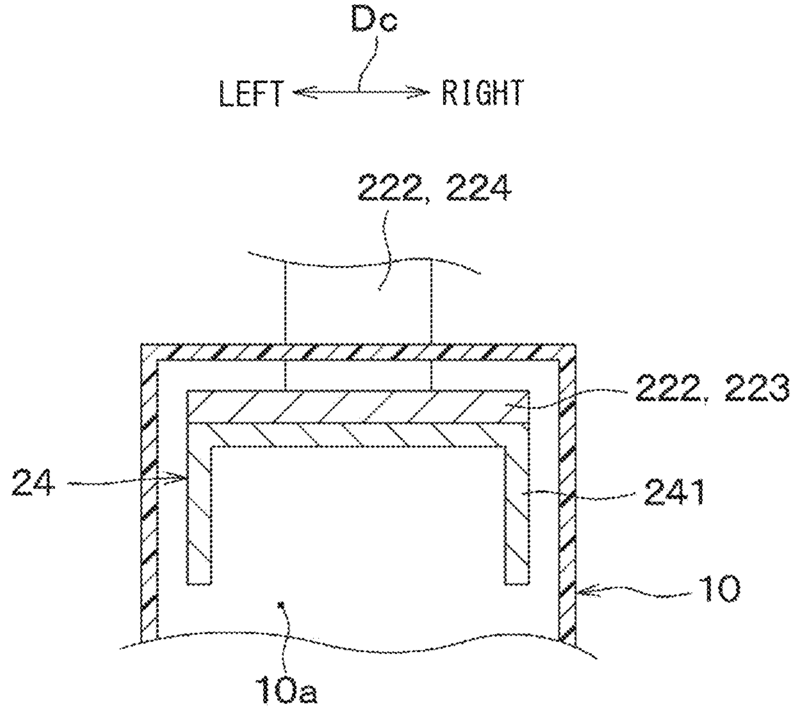
FIG. 4 is a cross-sectional view schematically illustrating a cross-sectional view on a line IV-IV of FIG. 2 in the first embodiment.

As shown in FIG. 2 and FIG. 4, the connecting portion 222 is fixed to the transmission member 24 at the accommodated portion 223 of the connecting portion 222.

The arc-shaped portion 224 extends so as to form an arc shape centered on the pedal axis CL when viewed in a direction along the pedal axis CL. The arc-shaped portion 224 is connected to the pedal attachment portion 221 at one end thereof, and is connected to the accommodated portion 223 at the other end thereof. The arc-shaped portion 224 moves in a circumferential direction Dpc of the pedal axis CL while passing through the insertion hole 10*b* of the housing 10 in association with the swing motion of the pedal 40.

Figure 5:
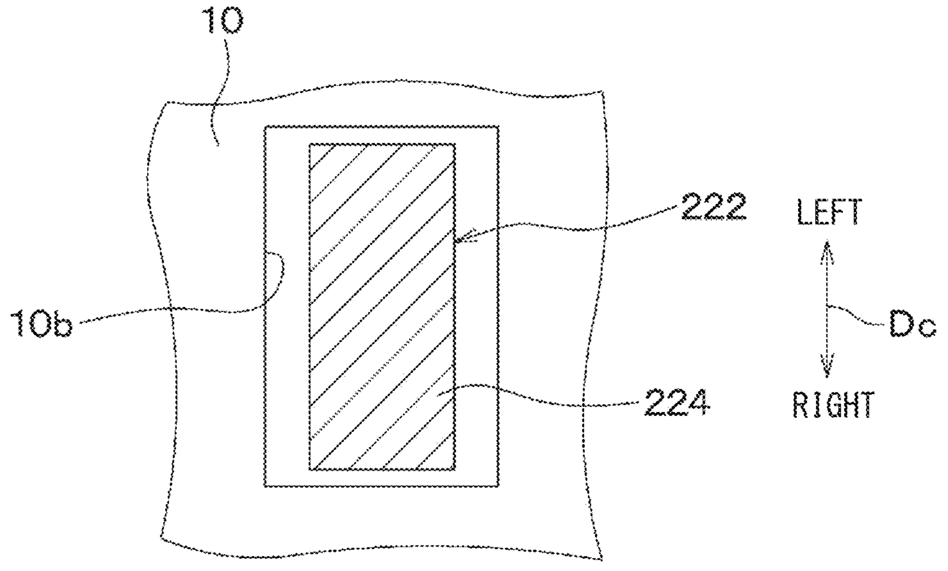
FIG. 5 is a cross-sectional view schematically illustrating a cross-sectional view on a line V-V of FIG. 2 in the first embodiment, showing the transverse cross section of an arc-shaped portion of a connecting member.

For example, a cross-sectional shape of the arc-shaped portion 224 is a rectangle extending in the axial direction of the pedal axis CL in a cross section perpendicular to the arc shape of the arc-shaped portion 224 (specifically, the cross section in FIG. 5).

As shown in FIG. 2, the pedal 40 is disposed on the upper side of the housing 10 in the vehicle direction, and is operated by stepping motion of the driver 81 from the side opposite to the housing 10. The pedal 40 is connected to the housing 10 via the connection member 22 and the rotation shaft 16, and is supported so as to be able to swing relative to the housing 10 about the pedal axis CL as a center.

In this embodiment, the pedal device 1 is a brake pedal device, and therefore the pedal 40 is a brake pedal. The pedal 40 has a generally flat plate shape and has a tread surface 40*a* formed on one side in a thickness direction of the pedal 40 and a pedal back surface 40*b* formed on the other side in the thickness direction of the pedal 40. For example, the pedal 40 is made of a highly rigid metal or resin in order to receive the stepping force from the driver 81.

The pedal 40 swings about the pedal axis CL as the pedal 40 is operated by stepping motion of a driver 81 onto the tread surface 40*a* of the pedal 40 from one side in the thickness direction. Therefore, the one side of the pedal 40 in the thickness direction is, in other words, an operation side of the pedal 40 that is the side to be operated by stepping motion of the driver 81. Further, the other side opposite to the one side in the thickness direction of the pedal 40 is, in other words, the counter-operation side opposite to the operation side of the pedal 40.

Figure 6:
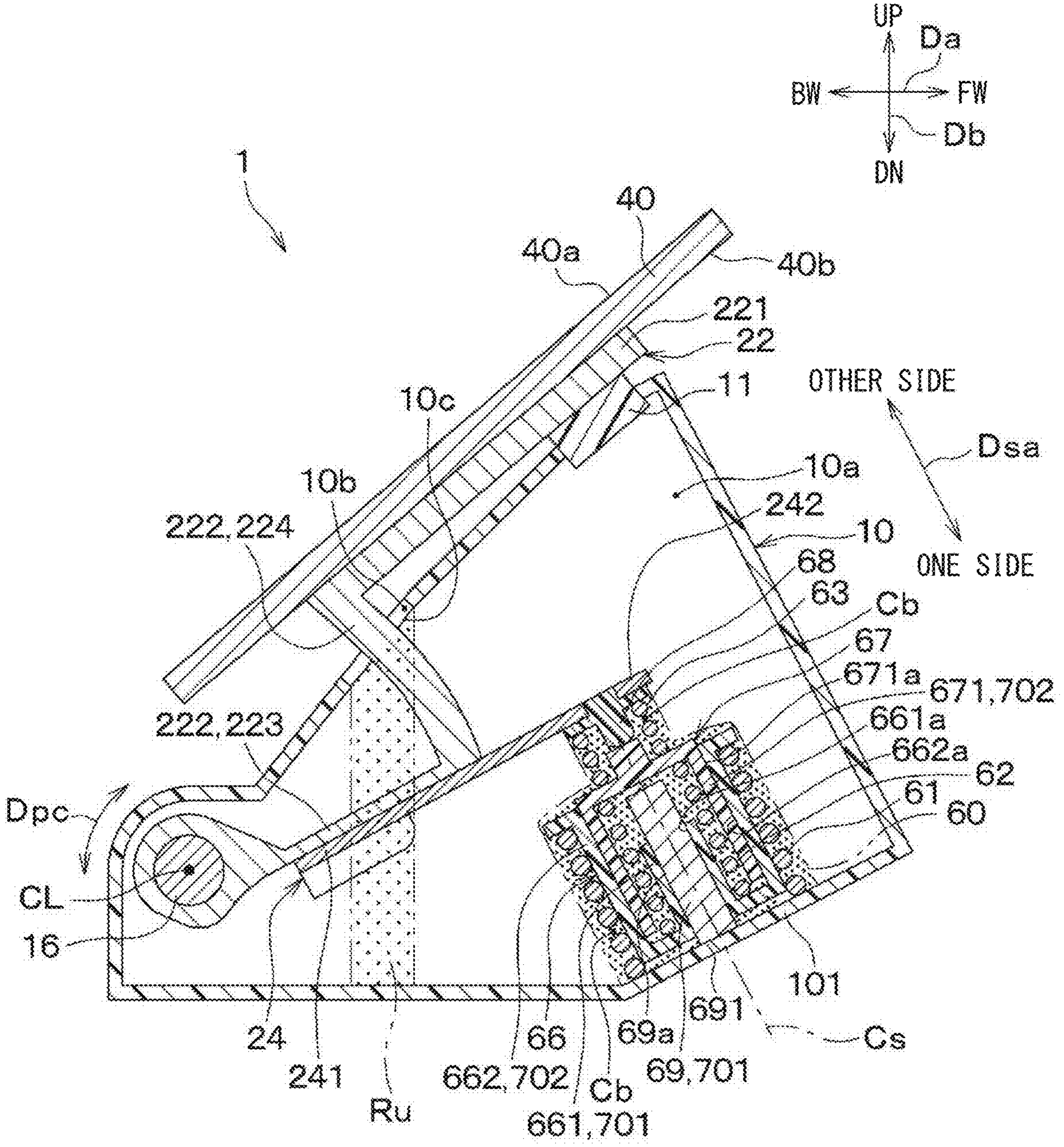
FIG. 6 is a cross-sectional view showing a schematic configuration of the pedal device when the pedal is in a fully stepping motion state in the first embodiment, in a posture of a vehicle-mounted state, and corresponds to FIG. 2.

If the pedal 40 is in the non-stepping motion state, it is disposed obliquely with respect to the vehicle forward-and-backward direction Da. Specifically, the pedal 40 is disposed obliquely such that the upper end of the pedal 40 is forward and above the lower end in the vehicle direction. Also, as shown in FIG. 6, if the pedal 40 is in the fully stepping motion state in which the driver 81 fully steps, the pedal 40 approaches a horizontal position compared to the non-stepping motion state of the pedal 40. However, the upper end of the pedal 40 is still positioned at an angle so as to be forward and upward in the vehicle direction relative to the lower end.

As shown in FIGS. 2 and 6, the pedal 40 swings about the pedal axis CL within a movable range Rp, which is a limited, predetermined rotation angle range of less than one rotation as the driver 81 increase stepping motion. The movable range Rp of the swinging motion of the pedal 40 is specifically a range from the minimum rotation position to the maximum rotation position of the pedal 40. That is, if the pedal 40 is in the non-stepping motion state, the rotation angle of the pedal 40 is at the minimum rotation position, and if the pedal 40 is in the fully stepping motion state, the rotation angle of the pedal 40 is at the maximum rotation position.

FIG. 2 shows the pedal device 1 in a state where the pedal 40 is in the non-stepping motion state, that is, shows the pedal device 1 in a released state where the driver 81 apply no stepping motion to the pedal 40. In contrast, FIG. 6 shows the pedal device 1 in a state where the pedal 40 is in the fully stepping motion state. The pedal 40 shown by the two-dot chain line in FIG. 2 represents the same posture as the pedal 40 shown in FIG. 6.

For example, the more the force applied by the driver 81 to the pedal 40 from a side of the stepping surface 40*a* increases, the more the upper end of the pedal 40 swings forward and downward in the vehicle direction within the above-mentioned movable range Rp. In short, the pedal 40 gradually swings from a posture shown in FIG. 2 to approach to a posture shown in FIG. 6, as the stepping force of the driver 81 increases.

Conversely, the more the stepping force applied to the pedal 40 by the driver 81 decreases, the more the upper end of the pedal 40 swings rearward and upward in the vehicle direction due to the action of the reaction force generator mechanism 60. In short, the pedal 40 swings to approach to a posture in upright position (more specifically, approach to a posture shown in FIG. 2) while being still in a tilted posture as the stepping force of the driver 81 decreases.

Regarding the positional relationship between the pedal 40 and the rotation shaft 16 etc., the rotation shaft 16 is disposed on a side of the pedal back surface 40*b* with respect to the pedal 40 and is disposed with a gap to the pedal 40. The housing 10 and the reaction force generator mechanism 60 are disposed on a side of the pedal back surface 40*b* with respect to the pedal 40.

In this embodiment, the minimum rotation position of the pedal 40 is determined, e.g., by the connection member 22 abutting a release stopper (not shown). Further, the maximum rotation position of the pedal 40 is determined by the pedal attachment portion 221 of the connection member 22 abutting against a stepping stopper 11. For example, the stepping stopper 11 is fixed to the housing 10 and is disposed at a position close to a front side in the vehicle direction on an outer wall of the housing 10 that covers the housing cavity 10*a* on the upper side in the vehicle direction.

The reaction force generator mechanism 60 generates a reaction force against the stepping force applied to the pedal 40 by the driver 81 in response to the swing motion of the pedal 40. Specifically, the reaction force generator mechanism 60 has a plurality of springs 61, 62 and 63 which are elastic bodies, a plurality of retainer members 66, 67 and 68 which hold the springs 61, 62 and 63 in a state able to expand and contract, and a guide shaft 69. In the reaction force generator mechanism 60, a plurality of springs 61, 62 and 63 are compressed by the stepping force applied to the pedal 40, thereby generating a reaction force against the stepping force in accordance with the swing motion of the pedal 40.

In detail, the plurality of springs 61, 62 and 63 refer to a first spring 61, a second spring 62, and a third spring 63, and the plurality of retainer members 66, 67 and 68 refer to a first retainer member 66, a second retainer member 67, and a third retainer member 68. The reaction force generator mechanism 60 is attached to a mechanism mount portion 101 which is part of the bottom of the housing 10 that covers the housing cavity 10*a* on the lower side in the vehicle direction.

The guide shaft 69 of the reaction force generator mechanism 60 is formed in a rod-like shape extending along a mechanism axis Cs as a center that extends in the normal direction of the mechanism mount portion 101. The guide shaft 69 has a base end 691 disposed on one side in the axial direction Dsa of the mechanism axis Cs (i.e., a mechanism axial direction Dsa), and is fixed at the base end 691 to the mechanism mount portion 101 of the housing 10.

The first to third springs 61, 62 and 63 are coil springs, and are arranged so as to be able to expand and contract in the mechanism axial direction Dsa. The first to third springs 61, 62 and 63 are disposed on the mechanism axis Cs as a center or a substantial center. The first spring 61 has a larger diameter than that of the second spring 62. The second spring 62 has a larger diameter than that of the third spring 63.

If the pedal 40 is in the non-stepping motion state, the second spring 62 is disposed on the other side of the first spring 61 in the mechanism axial direction Dsa in a state in which a part of the second spring 62 is inserted inside the first spring 61. The third spring 63 is disposed on the other side of the second spring 62 in the mechanism axial direction Dsa. The mechanism mount portion 101 of the housing 10 abuts against the first spring 61 from one side in the mechanism axial direction Dsa.

The first retainer member 66 is disposed between the first spring 61 and the second spring 62, abuts against the first spring 61 from the other side in the mechanism axial direction Dsa, and abuts against the second spring 62 from the one side in the mechanism axial direction Dsa. In addition, the second retainer member 67 is disposed between the second spring 62 and the third spring 63, abuts against the second spring 62 from the other side in the mechanism axial direction Dsa, and abuts against the third spring 63 from the one side in the mechanism axial direction Dsa.

The third retainer member 68 is disposed on the other side of the second retainer member 67 in the mechanism axial direction Dsa, and is disposed so as to sandwich the third spring 63 between itself and the second retainer member 67. That is, the third retainer member 68 abuts against the third spring 63 from the other side in the mechanism axial direction Dsa.

In this manner, the first to third springs 61, 62 and 63 are connected in series in a stepping force transmission path. Therefore, if the stepping force of the driver 81 is applied to the third retainer member 68, the first to third springs 61, 62 and 63 are compressed, thereby generating a reaction force against the pedaling force of the driver 81.

The transmission member 24 is a stepping force transmission member that transmits the stepping force of the driver 81 from the connection member 22 to the reaction force generator mechanism 60, and is connected to the reaction force generator mechanism 60. Therefore, the transmission member 24 deforms the plurality of springs 61, 62 and 63 of the reaction force generator mechanism 60 in response to the stepping force of the driver 81 received from the pedal 40.

Specifically, the transmission member 24 has a member base portion 241 and a member tip portion 242. The member base 241 is fixed to the accommodated portion 223 of the connection member 22. In addition, the third retainer member 68 of the reaction force generator mechanism 60 is fixed to the member tip portion 242. When viewed in the direction along the pedal axis CL, the member tip portion 242 is located on the opposite side to the rotating shaft 16 side with respect to the member base portion 241.

As shown in FIGS. 2 and 6, the first retainer member 66 in the reaction force generator mechanism 60 has a first outer cylindrical portion 661 and a second outer cylindrical portion 662 formed by extending on the mechanism axis Cs as a center. The guide shaft 69 serving as a first inner insertion portion is inserted into an inside of the first outer cylindrical portion 661. The first outer cylindrical portion 661 and the guide shaft 69 slide while fitting together as the first spring 61 expands and contracts. This allows the first spring 61 to smoothly expand and contract in the mechanism axial direction Dsa. The first outer cylindrical portion 661 has a sliding surface 661*a* on the inner peripheral side, and the guide shaft 69 has a sliding surface 69*a* which slides against the sliding surface 661*a* of the first outer cylindrical portion 661.

In other words, the first outer cylindrical portion 661 and the guide shaft 69 form a first guide portion 701, and the first guide portion 701 guides the first spring 61 so that the first spring 61 expands and contracts in the mechanism axial direction Dsa. In other words, the first guide portion 701 restricts a posture of the first spring 61 while allowing the first spring 61 to expand and contract in the mechanism axial direction Dsa. Restricting a posture of the first spring 61 means, for example, preventing the first spring 61 from being tilted with respect to the mechanism axis Cs.

The second retainer member 67 also has a second inner insertion portion 671 formed by extending on the mechanism axis Cs as a center. The second inner insertion portion 671 is inserted into an inside of the second outer cylindrical portion 662 of the first retainer member 66. The second outer cylindrical portion 662 and the second inner insertion portion 671 slide while fitting together as the second spring 62 expands and contracts. This allows the first spring 61 to smoothly expand and contract in the mechanism axial direction Dsa. The second outer cylindrical portion 662 has a sliding surface 662*a* on the inner peripheral side, and the second inner insertion portion 671 has a sliding surface 671*a* that slides against the sliding surface 662*a* of the second outer cylindrical portion 662.

In other words, the second outer cylindrical portion 662 and the second inner insertion portion 671 form a second guide portion 702, and the second guide portion 702 guides the second spring 62 so that the second spring 62 expands and contracts in the mechanism axial direction Dsa. In other words, the second guide portion 702 restricts a posture of the second spring 62 while allowing the second spring 62 to expand and contract in the mechanism axial direction Dsa. Restricting a posture of the second spring 62 means, for example, preventing the second spring 62 from being tilted with respect to the mechanism axis Cs.

The sliding surfaces 69*a*, 661*a*, 662*a* and 671*a* of the guide shaft 69, the first outer cylindrical portion 661, the second outer cylindrical portion 662, and the second inner insertion portion 671 correspond to sliding portions where the parts slide against each other as the pedal 40 swings.

In addition, a gap Cb is formed between the wires of each of the springs 61, 62 and 63 of the reaction force generator mechanism 60, and the parts located on either side of the gap Cb move closer to or farther apart as the pedal 40 swings. Therefore, the first to third springs 61, 62 and 63 each correspond to a mechanism-specific portion of the present disclosure in which adjacent portions of the reaction force generator mechanism 60 separated by the gap Cb are displaced relative to each other in response to the swing motion of the pedal 40.

As shown in FIGS. 2 and 6, the inner opening end 10*c* of the insertion hole 10*b* of the housing 10 opens to the housing cavity 10*a* facing downward in the vehicle direction or diagonally downward in the vehicle direction of in the vehicle-mounted state. The same applies to the stored state of the pedal device 1 described later (see FIG. 7).

Here, let us consider an opening end lower area Ru obtained by extending the inner opening end 10*c* within the housing 10 downward in the vehicle direction along the vehicle up-and-down direction Db. In this case, the opening end lower area Ru is positioned at a distance L1 from the rotating shaft 16 in the vehicle forward-and-backward direction Da, and is positioned at a distance L2 from the reaction force generator mechanism 60 in the vehicle forward-and-backward direction Da.

Therefore, the opening end lower area Ru does not overlap with any of the rotation angle sensor 79, the rotation shaft sliding surfaces 16*a* and 16*b*, and the bearing sliding surfaces 18*a* and 19*a* in the non-stepping motion state of the pedal 40 as shown in FIG. 2, for example. The opening end lower area Ru does not overlap any of the sliding surfaces 69*a*, 661*a*, 662*a* and 671*a* disposed on the reaction force generator mechanism 60 and the first to third springs 61, 62 and 63. This is also true in a state where the pedal 40 is in the fully-stepping motion state as shown in FIG. 6.

In other words, regardless of positions of the pedal 40 within the movable range Rp, the opening end lower area Ru does not overlap with the rotation angle sensor 79, the sliding surfaces 16*a*, 16*b*, 18*a*, 19*a*, 69*a*, 661*a*, 662*a* and 671*a*, and the first to third springs 61, 62 and 63. In other words, the opening end lower area Ru is positioned spaced apart at a distance from the rotation angle sensor 79, the sliding surfaces 16*a*, 16*b*, 18*a*, 19*a*, 69*a*, 661*a*, 662*a* and 671*a*, and the first to third springs 61, 62 and 63. The insertion holes 10*b* of the housing 10 are arranged in this manner. In FIG. 2, FIG. 6, and corresponding drawings described below, the opening end lower area Ru is hatched in dots.

Figure 7:
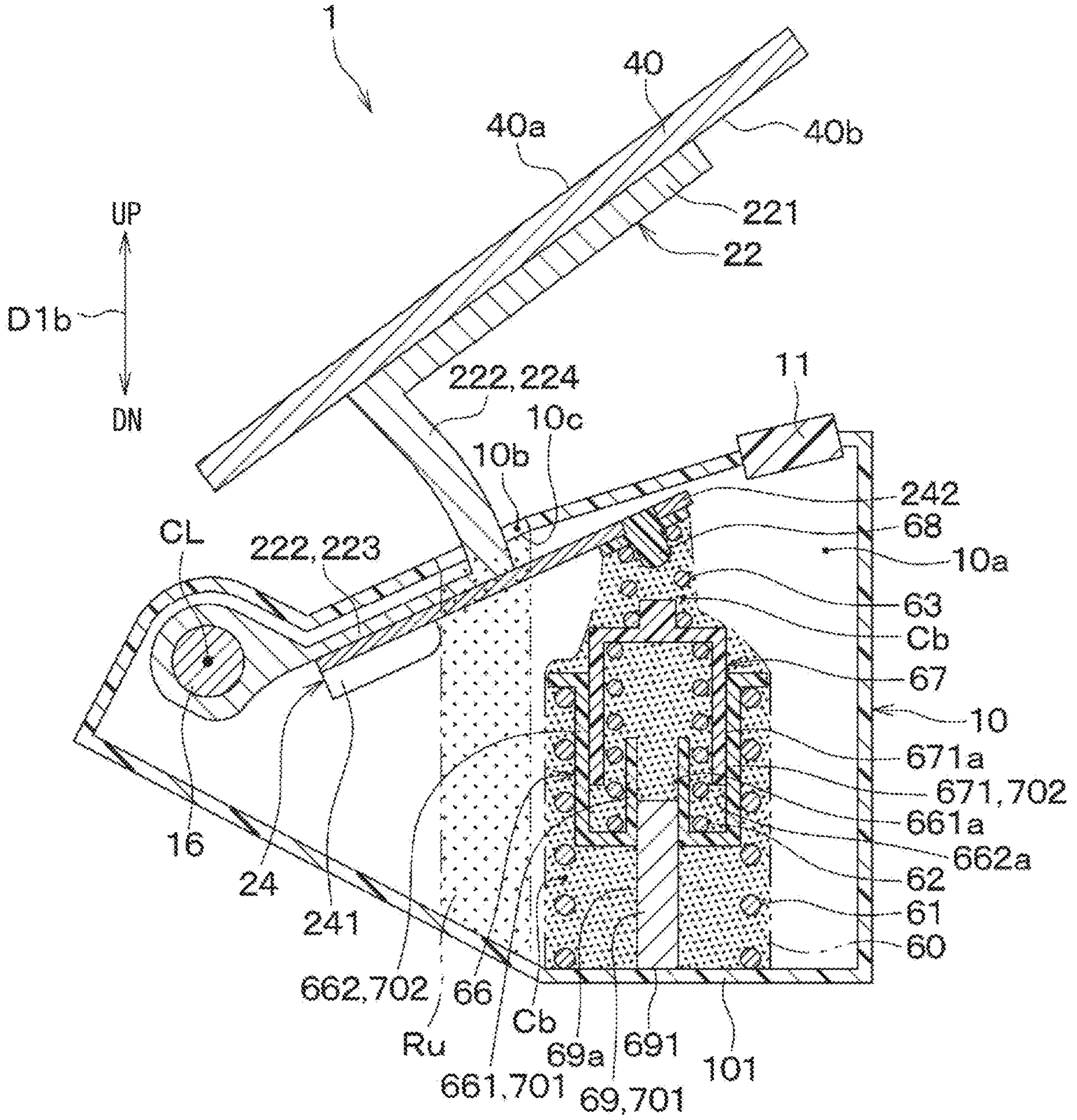
FIG. 7 is a cross-sectional view showing a schematic configuration of the pedal device when the pedal is in a non-stepping motion state in the first embodiment, in a posture when it is in a stored state, and corresponds to FIG. 2.

Descriptions about the above-mentioned opening end lower area Ru may be the same not only as in the vehicle-mounted state, but also as in the stored state in which the pedal device 1 is stored as shown in FIG. 7. That is, the opening end lower area Ru does not overlap with any of the rotation angle sensor 79, the rotation shaft sliding surfaces 16*a* and 16*b*, and the bearing sliding surfaces 18*a* and 19*a* in the stored state shown in FIG. 10. The opening end lower area Ru does not overlap any of the sliding surfaces 69*a*, 661*a*, 662*a* and 671*a* disposed on the reaction force generator mechanism 60 and the first to third springs 61, 62 and 63.

In addition, the up-down direction of the pedal device 1 is not necessarily the same as the vehicle up-and-down direction Db in the above-described stored state of the pedal device 1. Therefore, the opening end lower area Ru changes depending on a posture of the pedal device 1, and the opening end lower area Ru in the stored state is defined as an area obtained by extending the inner opening end 10*c* downward along the up-and-down direction D1*b* within the housing 10 in the stored state. In addition, the stored state of the pedal device 1 does not mean a state in which the pedal device 1 is temporarily placed on a desk or the like, but, for example, is a state in which the pedal device 1 is kept in the same posture for a certain period of time using packaging material, a jig, etc. If the pedal device 1 is in the stored state, the pedal 40 is kept in the non-stepping motion state.

In addition, the stored state and the vehicle-mounted state of the pedal device 1 are collectively referred to as a predetermined state in which the pedal system 1 is stored or mounted on the vehicle 80. In addition, the up-and-down direction in the vehicle-mounted state, which coincides with the vehicle up-and-down direction Db, and the up-and-down direction D1*b* in the stored state are collectively referred to as the predetermined state up-and-down direction.

Figure 8:
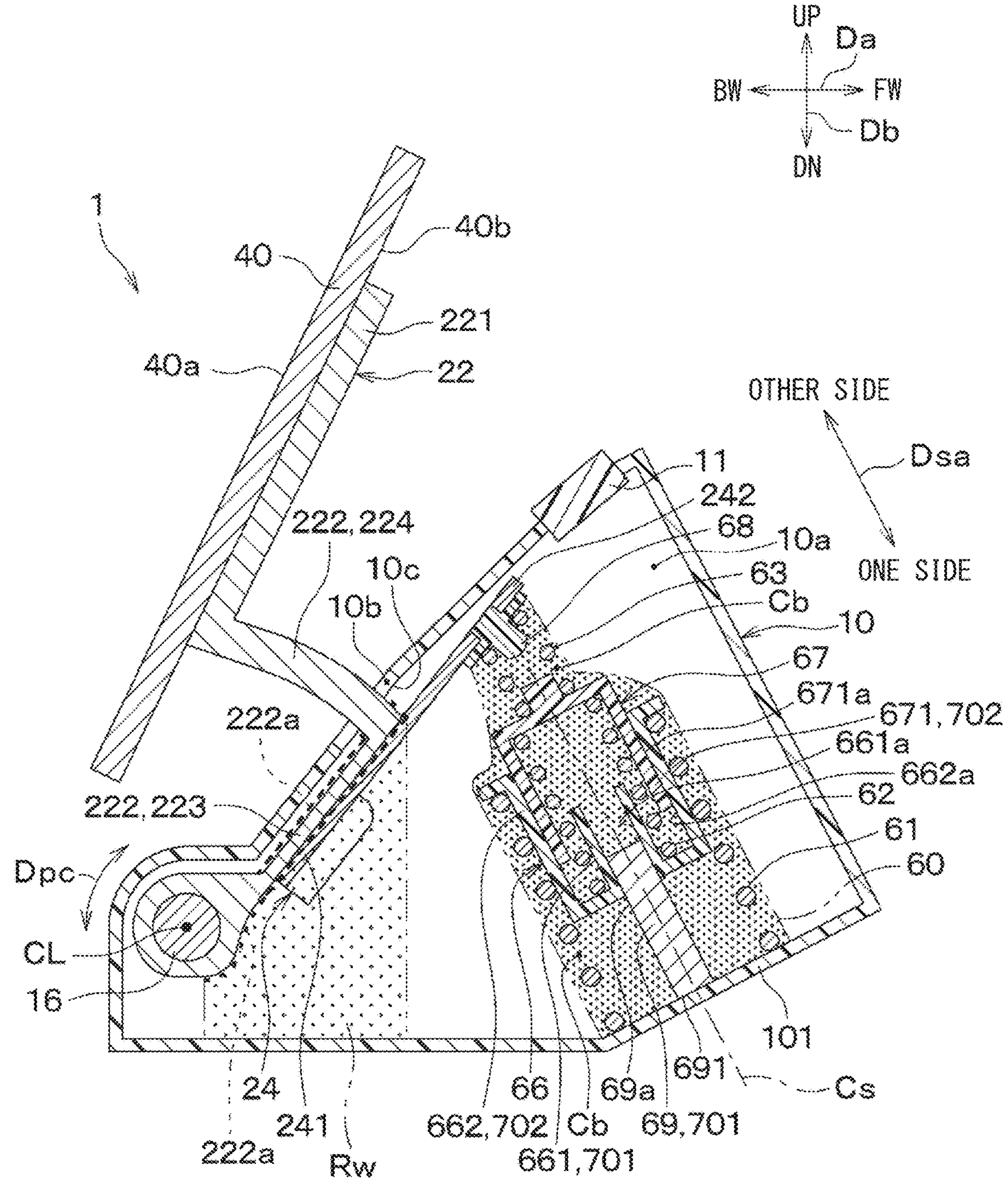
FIG. 8 is a cross-sectional view showing a flow-down portion lower area formed within the housing, on the same cross-sectional view of FIG. 2.
Figure 9:
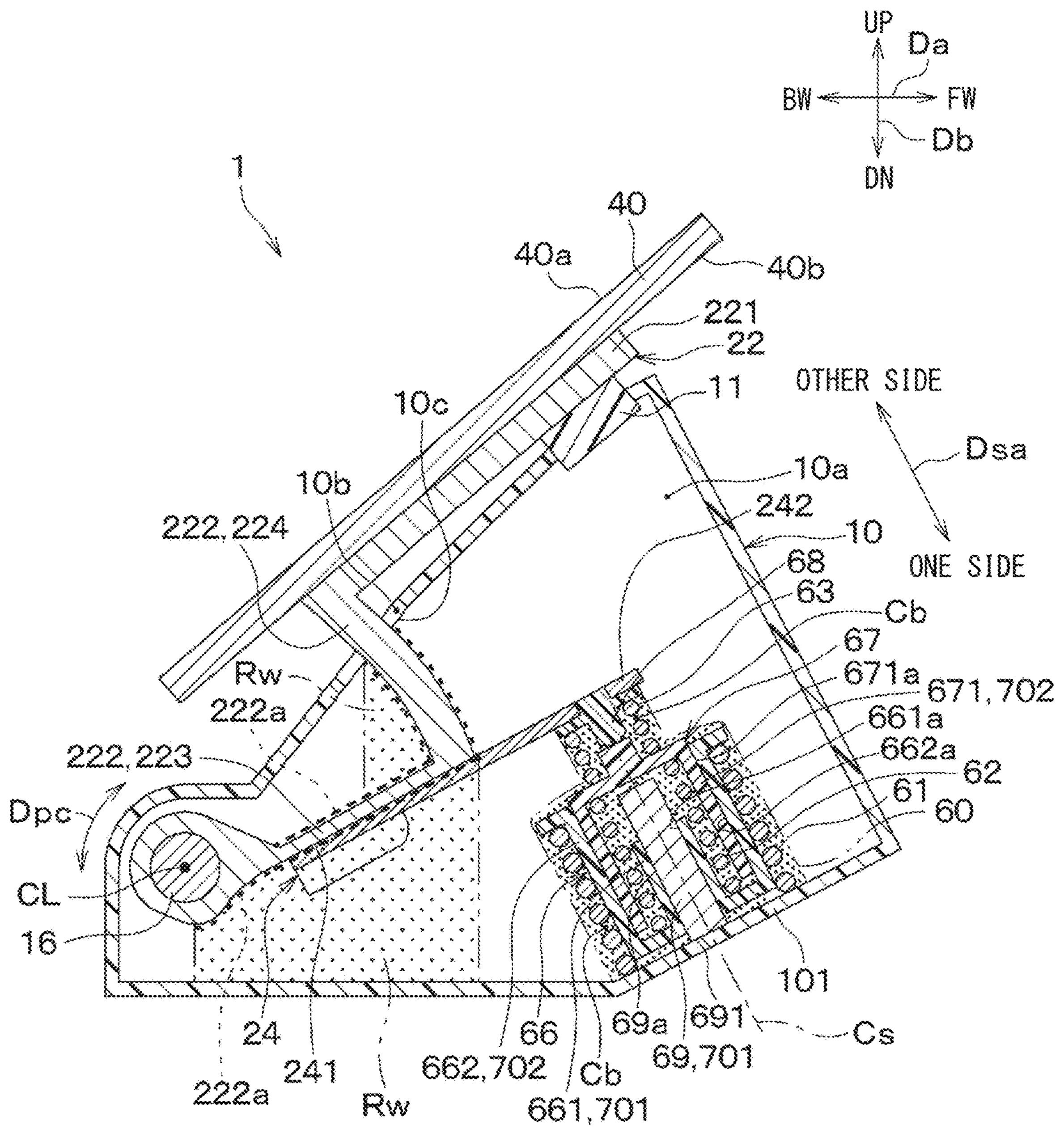
FIG. 9 is a cross-sectional view showing a flow-down portion lower area formed within the housing, on the same cross-sectional view of FIG. 6.

Furthermore, in this embodiment, the connecting portion 222 is formed by taking into consideration the fact that water enters the housing cavity 10*a* while flowing down due to the gravity force to travel along the connecting portion 222 from an inside of the insertion hole 10*b*. Specifically, a specified one of a flow-down portion lower area Rw does not overlap with any of the rotation angle sensor 79, the rotation shaft sliding surfaces 16*a* and 16*b*, and the bearing sliding surfaces 18*a* and 19*a* in the non-stepping motion state of the pedal 40 as shown in FIG. 8. The flow-down portion lower area Rw does not overlap any of the sliding surfaces 69*a*, 661*a*, 662*a* and 671*a* disposed on the reaction force generator mechanism 60 and the first to third springs 61, 62 and 63. This is also true in a state where the pedal 40 is in the fully-stepping motion state as shown in FIG. 9.

In other words, regardless of positions of the pedal 40 within the movable range Rp, the flow-down portion lower area Rw does not overlap with the rotation angle sensor 79, the sliding surfaces 16*a*, 16*b*, 18*a*, 19*a*, 69*a*, 661*a*, 662*a* and 671*a*, and the first to third springs 61, 62 and 63. In other words, the flow-down portion lower area Rw is positioned spaced apart at a distance from the rotation angle sensor 79, the sliding surfaces 16*a*, 16*b*, 18*a*, 19*a*, 69*a*, 661*a*, 662*a* and 671*a*, and the first to third springs 61, 62 and 63. The connecting portion 222 is formed as described above.

The above-mentioned flow-down portion lower area Rw is an area obtained by extending the flow-down portion 222*a*, where water flows down due to the gravity force to travel along the connecting portion 222 from an inside of the insertion hole 10*b* of the connecting portion 222, downward in the vehicle direction along the vehicle up-and-down direction Db within the housing 10. In another expression about the flow-down portion 222*a*, it can be said that the flow-down portion 222*a* is a portion continuously extended downwardly from a portion inside the insertion hole 10*b*, which is a start point, among an inclined surface of the connecting portion 222. In FIG. 8 and FIG. 9, and corresponding drawings described below, the flow-down portion lower area Rw is hatched with dots, and an area of the flow-down portion 222*a* is indicated by a thick dashed line.

Figure 10:
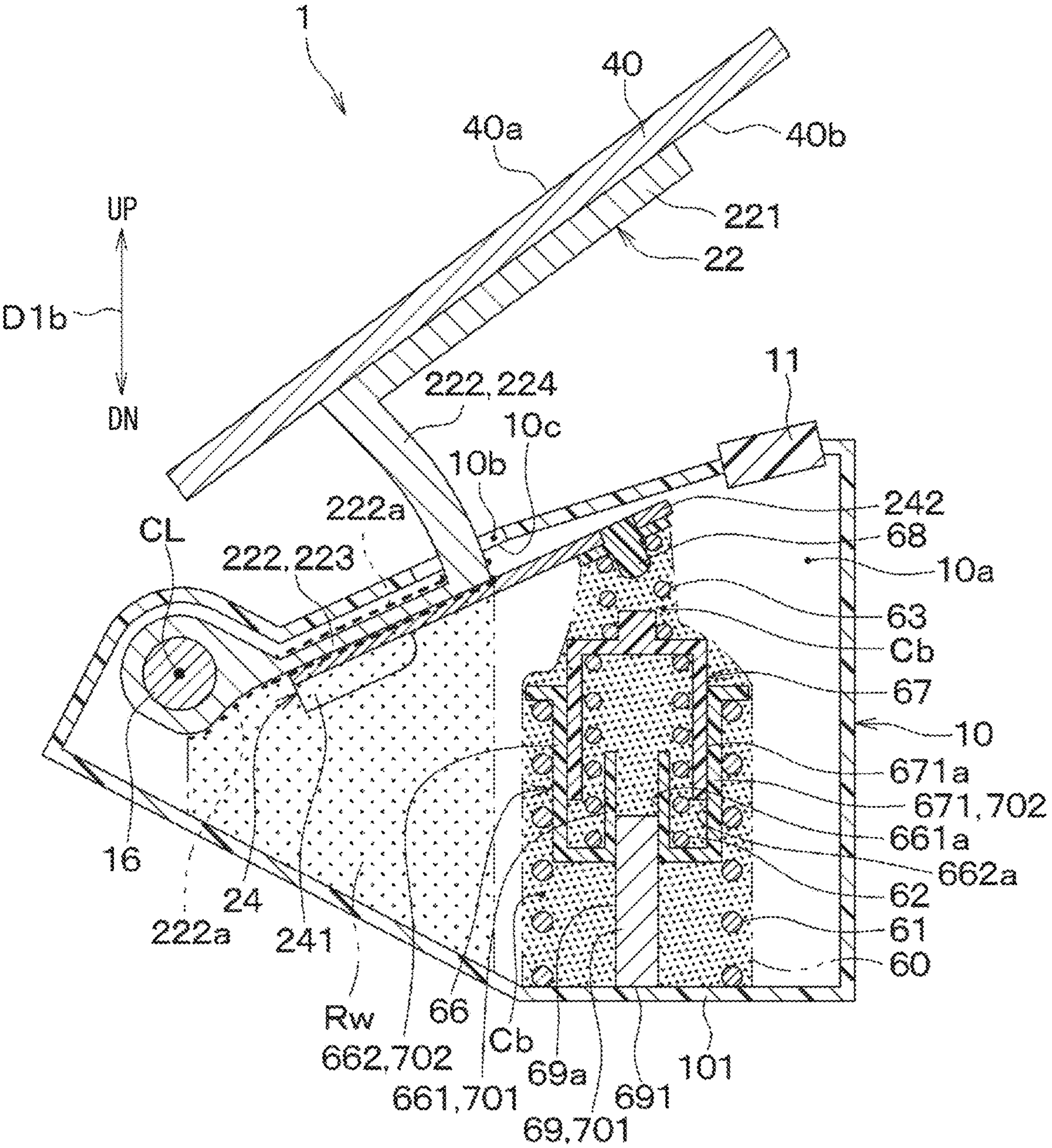
FIG. 10 is a cross-sectional view showing a flow-down portion lower area formed within the housing, on the same cross-sectional view of FIG. 7.

Descriptions about the above-mentioned flow-down portion lower area Rw may be the same not only as in the vehicle-mounted state of the pedal device 1, but also as in the stored state of the pedal device 1 as shown in FIG. 10. That is, in the stored state shown in FIG. 10, the flow-down portion lower area Rw does not overlap with any of the rotation angle sensor 79, the rotation shaft sliding surfaces 16*a* and 16*b*, and the bearing sliding surfaces 18*a* and 19*a*. The flow-down portion lower area Rw does not overlap any of the sliding surfaces 69*a*, 661*a*, 662*a* and 671*a* disposed on the reaction force generator mechanism 60 and the first to third springs 61, 62 and 63.

In addition, in the above-described stored state of the pedal device 1, the flow-down portion lower area Rw is also defined using the up-and-down direction D1*b* in the stored state, similar to the above-described opening end lower area Ru. In other words, the flow-down portion lower area Rw in the stored state is defined as an area obtained by extending the flow-down portion 222*a*, where water flows down due to the gravity force to travel along the connecting portion 222 from an inside of the insertion hole 10*b* of the connecting portion 222, downward along the up-and-down direction D1*b* within the housing 10.

In the pedal device 1 configured as described above, if the stepping force of the driver 81 is applied to the pedal 40, the pedal 40, the rotating shaft 16, the connection member 22 and the transmission member 24 swing around the pedal axis center CL, as shown in FIGS. 2 and 6. In detail, the pedal 40, the rotation shaft 16, the connection member 22 and the transmission member 24 swing about the pedal axis CL so that the upper end of the pedal 40 is displaced forward and downward in the vehicle direction. In other words, the pedal 40 performs swing motion in which a posture varies from the non-stepping motion state to the fully stepping motion state.

At this time, the rotation angle sensor 79 disposed in the pedal device 1 outputs an electrical signal indicating the rotation angle of the pedal body 22 to the electronic control unit 83. The electronic control unit 83 drives and controls a brake circuit included in the brake-by-wire system 82 (see FIG. 1) to generate the hydraulic pressure (e.g., oil pressure) needed to brake the vehicle 80, and slows or stops the vehicle 80 by operating brake pads in response to the hydraulic pressure generated.

In addition, the first spring 61, the second spring 62 and the third spring 63 of the reaction force generator mechanism 60 are compressed greater as the pedal 40 swings from the non-stepping motion state to the fully-stepping motion state in a swinging motion range in which the pedal 40 changes its posture from the non-stepping motion state to the fully-stepping motion state.

The pedal device 1 of the present embodiment described above performs following advantages.

According to this embodiment, the opening end lower area Ru shown in FIG. 2 does not overlap with the rotation angle sensor 79 and the sliding portion where the parts slide against each other as the pedal 40 swings in the non-stepping motion state of the pedal 40 in the vehicle-mounted state of the pedal device 1. Furthermore, the opening end lower area Ru does not overlap with the mechanism-specific portion where adjacent portions of the reaction force generator mechanism 60 across the gap Cb are displaced relative to each other as the pedal 40 swings. This is also true in a state where the pedal 40 is in the fully stepping motion state as shown in FIG. 6 and in the stored state of the pedal device 1.

Therefore, foreign matter or the like entering the housing 10 through the insertion hole 10*b* of the housing 10 is unlikely to reach the rotation angle sensor 79. The same may be applied to the sliding portions and the mechanism-specific portion disposed inside the housing 10.

Therefore, if the rotation angle sensor 79, the sliding portions, or any of the mechanism-specific portion are disposed within the housing 10, defects such as excessive wear and adhesion between parts may be prevented from occurring due to water or foreign matter entering the housing 10. Furthermore, the pedal device 1 may be designed to be highly robust against an entering of water, foreign matter, etc. into the housing 10.

(1) Furthermore, according to this embodiment, the flow-down portion lower area Rw shown in FIG. 8 does not overlap with the rotation angle sensor 79, the sliding portion, and the mechanism-specific portion in the vehicle-mounted state of the pedal device 1. This is also true regardless of positions of the pedal 40 within the movable range Rp of the pedal 40, and also in the stored state of the pedal device 1.

Therefore, it is possible to prevent water that has entered the housing 10 via the connecting portion 222 from entering into the rotation angle sensor 79, the sliding portion, and the mechanism-specific portion.

(2) Furthermore, according to this embodiment, the first to third springs 61, 62 and 63 of the reaction force generator mechanism 60 shown in FIG. 2 correspond to the mechanism-specific portion described above that is separated from the opening end lower area Ru and the flow-down portion lower area Rw. The sliding surfaces 69*a*, 661*a*, 662*a* and 671*a* of the guide shaft 69, the first outer cylindrical portion 661, the second outer cylindrical portion 662, and the second inner insertion portion 671 of the reaction force generator mechanism 60 correspond to the above-mentioned sliding portions away from the opening end lower area Ru and the flow-down portion lower area Rw. Therefore, malfunctions in the reaction force generator mechanism 60 caused by water or foreign matter entering the housing 10 can be suppressed.

(3) Furthermore, according to this embodiment, the bearing sliding surfaces 18*a* and 19*a* and the rotation shaft sliding surfaces 16*a* and 16*b* shown in FIG. 3 correspond to the sliding portions that are separated from the opening end lower area Ru and the flow-down portion lower area Rw, respectively. Therefore, it is possible to suppress malfunctions in the reaction force generator mechanism 60 caused by water or foreign matter entering the housing 10.

(4) Furthermore, according to this embodiment, the opening end lower area Ru shown in FIG. 2 and FIG. 6 does not overlap with the rotation angle sensor 79, the sliding portion, and the mechanism-specific portion in the vehicle-mounted state of the pedal device 1. This is true regardless of positions of the pedal 40 within the movable range Rp of the pedal 40.

Therefore, malfunctions caused by water or foreign matter entering the housing 10 may be prevented under various conditions of the vehicle 80, such as when the pedal 40 is depressed while the vehicle is stopped, or when the pedal 40 is released while the vehicle is moving.

(5) Furthermore, according to this embodiment, the arc-shaped portion 224 of the connection member 22 extends so as to form an arc shape centered on the pedal axis CL. Therefore, it is easy to realize a structure that makes it difficult for foreign matter to enter the housing 10 through the insertion hole 10*b* by making gaps formed around the arc-shaped portion 224 in the insertion hole 10*b* of the housing 10 small.

Second Embodiment

A second embodiment is described next. This embodiment is explained mainly with respect to points different from those of the first embodiment. In addition, explanations of the same or equivalent portions as those in the above embodiment is omitted or simplified. The same may be applied to a description of the embodiments described later.

Figure 11:
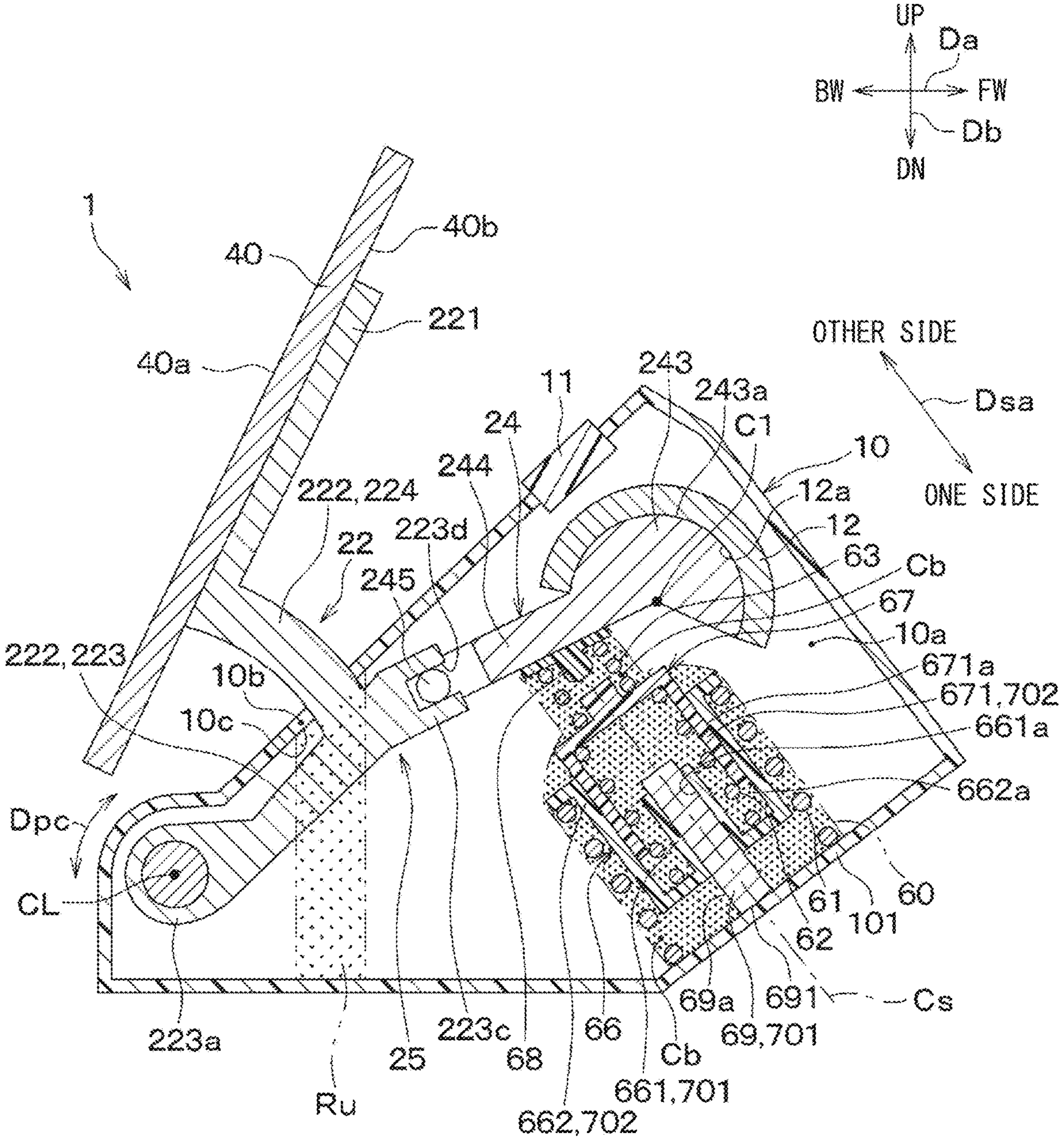
FIG. 11 is a cross-sectional view of a second embodiment, schematically illustrating a schematic configuration of the pedal device in a non-stepping motion state of a pedal, in a posture of a vehicle-mounted state, and corresponds to FIG. 2.

As shown in FIG. 11, in this embodiment, the transmission member 24 is connected to the connection member 22 but is not fixed to the connection member 22. The transmission member 24 swings, while moving with the connection member 22, on a transmission member axis C1 as a center which is provided as a separate axis different from the pedal axis CL and is parallel to the pedal axis CL. In this point, the present embodiment is different from the first embodiment. The transmission member axis C1 is located on an opposite side of the pedal axis CL across the mechanism axis Cs when viewed in a direction along the pedal axis CL.

Specifically, in the connection member 22 of this embodiment, the other end 223*c* of the accommodated portion 223, which is located on the opposite side to the one end 223*a*, is formed with a link groove 223*d*. The link groove 223*d* is cut in a direction intersecting the circumferential direction Dpc of the pedal axis CL, and penetrates the other end portion 223*c* in the axial direction of the pedal axis CL. The link groove 223*d* is located on the opposite side of the transmission member axis C1 across the mechanism axis Cs, and is located between the rotation shaft 16 and the transmission member axis C1 in the radial direction of the pedal axis CL.

The transmission member 24 of this embodiment is arranged within the housing cavity 10*a* similar to the first embodiment, but has a supported portion 243 and an arm portion 244 instead of the member base portion 241 and the member tip portion 242 (see FIG. 2) of the first embodiment.

The supported portion 243 has an outer sliding surface 243*a*. The outer sliding surface 243*a* is a sliding surface that has an arc shape centered on the transmission member axis C1 in a cross section perpendicular to the transmission member axis C1, and extends radially outward from the transmission member axis C1 in the axial direction of the transmission member axis C1.

The pedal device 1 also includes a transmission member support portion 12 that supports the supported portion 243 of the transmission member 24 so as to be able to swing relative to the housing 10 around the transmission member axis C1 as a center. The transmission member support portion 12 is disposed in the housing cavity 10*a* and is fixed to the housing 10. The transmission member support portion 12 has an inner sliding surface 12*a*.

The inner sliding surface 212*a* is a sliding surface that has an arc shape centered on the transmission member axis C1 in a cross section perpendicular to the transmission member axis C1, and extends radially inward from the transmission member axis C1 in the axial direction of the transmission member axis C1. An outer sliding surface 243*a* of the supported portion 243 is in contact with the inner sliding surface 12*a* so as to be able to slide relative to the inner sliding surface 12*a* in a circumferential direction of the transmission member axis C1. Further, the inner sliding surface 12*a* of the transmission member support portion 12 includes a surface facing one side in the mechanism axial direction Dsa in order to enable the transmission member support portion 12 to resist a reaction force of the reaction force generator mechanism 60.

The arm portion 244 of the transmission member 24 extends from the supported portion 243 toward the link groove 223*d* of the accommodated portion 223. The arm portion 244 has a link shaft 245 fixed to a tip portion of the arm portion 244 on a side of the link groove 223*d*. The link shaft 245 has a cylindrical shape parallel to the pedal axis CL, and is fitted into the link groove 223*d*. The link groove 223*d* allows the link shaft 245 to move within the link groove 223*d* in the depth direction of the link groove 223*d*.

Additionally, a third retainer member 68 is fixed to the arm portion 244 at a position between the link shaft 245 and the transmission member axis C1 in a view along the pedal axis CL. The arm portion 244 abuts against the third retainer member 68 from the other side in the mechanism axial direction Dsa. Therefore, the arm portion 244 can push the reaction force generator mechanism 60 from the other side to the one side in the mechanism axial direction Dsa.

With this configuration, if the pedal 40 is operated by stepping motion, e.g., from the non-stepping motion state, the pedal 40 rotates about the pedal axis CL so as to approach the fully stepping motion state, and at the same time, the connection member 22 rotates integrally with the pedal 40. As a result, the accommodated portion 223 of the connection member 22 rotates the arm portion 244 about the transmission member axis C1 so as to displace the link shaft 245 to one side in the mechanism axial direction Dsa. As a result, the arm portion 244 displaces the third retainer member 68 to one side in the mechanism axial direction Dsa, whereby the first to third springs 61, 62 and 63 of the reaction force generator mechanism 60 are compressed to generate a reaction force against the stepping force of the driver 81.

As understood from the above operation, the accommodated portion 223 of the connection member 22 and the arm portion 244 of the transmission member 24 link the connection member 22 and the transmission member 24 together, thereby forming a link mechanism 25 that links the members together. In the link mechanism 25, the other end 223*c* of the accommodated portion 223 in which the link groove 223*d* is formed and the link shaft 245 slide relative to each other as the pedal 40 swings, and thus correspond to the sliding portion.

In this embodiment, the inner sliding surface 12*a* of the transmission member support portion 12 and the outer sliding surface 243*a* of the supported portion 243 also slide against each other in accordance with the swing motion of the pedal 40, and therefore correspond to the above-mentioned sliding portion.

As described above, in this embodiment, the number of locations of the sliding parts is increased compared to the first embodiment, but the positional relationships between the sliding portions and the opening end lower area Ru is the same as in the first embodiment. In other words, the opening end lower area Ru does not overlap with the sliding portion in the non-stepping motion state of the pedal 40 in the vehicle-mounted state of the pedal device 1. This is also true in a state where the pedal 40 is in the fully stepping motion state and in the stored state of the pedal device 1.

Positional relationships between the sliding portions and the flow-down portion lower area Rw (see FIGS. 8 to 10) are also the same as in the first embodiment. That is, the flow-down portion lower area Rw does not overlap with the sliding portions in the vehicle-mounted state of the pedal device 1. This is also true regardless of positions of the pedal 40 within the movable range Rp of the pedal 40, and also true in the stored state of the pedal device 1.

(1) As described above, according to this embodiment, the inner sliding surface 12*a* of the transmission member support portion 12 and the outer sliding surface 243*a* of the supported portion 243 each correspond to the sliding portion. The positional relationships between the sliding portions and the opening end lower area Ru, and the positional relationships between the sliding portions and the flow-down portion lower area Rw are as described above. Therefore, problems caused by water or foreign matter entering the housing 10 may be prevented from occurring in the rotational operation of the transmission member 24.

(2) According to this embodiment, among the link mechanism 25, the other end 223*c* of the accommodated portion 223 in which the link groove 223*d* is formed, and the link shaft 245 correspond to the sliding portions, respectively. Therefore, it is possible to suppress malfunctions in the reaction force generator mechanism 60 caused by water or foreign matter entering the housing 10.

This embodiment is the same as the first embodiment, except for the above described aspects. Thus, in the present embodiment, it is possible to obtain advantages caused by common configurations with the first embodiment described above similar to the first embodiment.

Third Embodiment

A third embodiment is described next. The present embodiment is explained primarily with respect to portions different from those of the second embodiment.

Figure 12:
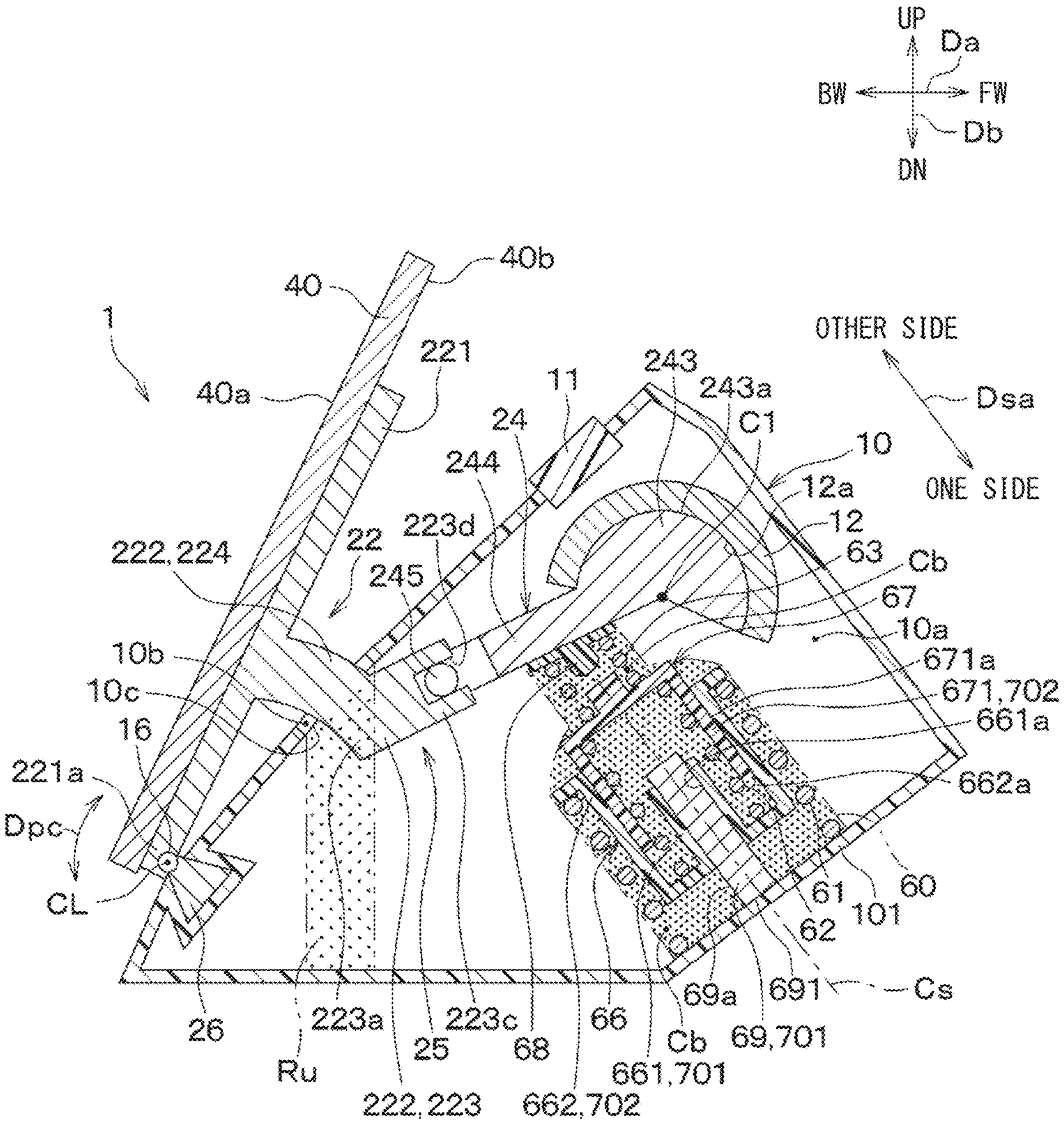
FIG. 12 is a cross-sectional view of a third embodiment, schematically illustrating a schematic configuration of the pedal device in a non-stepping motion state of a pedal, in a posture of a vehicle-mounted state, and corresponds to FIG. 2.

As shown in FIG. 12, in this embodiment, the rotation shaft 16 that supports the pedal 40 in a rotatable manner is disposed outside the housing 10. The present embodiment is different from the second embodiment in this point.

Specifically, in this embodiment, the pedal device 1 includes a rotation shaft support portion 26 fixed to the housing 10. Further, the pedal attachment portion 221 of the connection member 22 extends along the pedal 40 to the lower end portion of the pedal 40 or to the vicinity thereof. The rotation shaft 16 is fitted into a fitting hole in the lower end 221*a* of the pedal attachment portion 221 and into a fitting hole provided in a portion of the rotation shaft support portion 26 that is positioned outside the housing 10.

The rotation shaft 16 is fixed to one of the lower end 221*a* of the pedal attachment portion 221 and the rotation shaft support portion 26, and slides relative to the other as the driver 81 increases stepping motion to the pedal 40. The rotation shaft 16 is formed in a cylindrical shape centered on the pedal axis CL and extends in the axial direction of the pedal axis CL, similarly to the first embodiment. In this manner, the pedal 40 of this embodiment is connected to the housing 10 via the rotation shaft 16 so as to be able to swing about the pedal axis CL as a center.

Furthermore, since the rotation shaft 16 in this embodiment is positioned outside the housing 10, no through hole 223*b* (see FIG. 3) is formed in one end 223*a* of the accommodated portion 223 of the connection member 22, and the accommodated portion 223 is not connected to the rotation shaft 16. The accommodated portion 223 is connected to the arc-shaped portion 224 at one end 223*a*. That is, the connecting portion 222 of the connection member 22 connects the pedal 40 and the transmission member 24, but does not connect the pedal 40 and the rotation shaft 16.

This embodiment is the same as the second embodiment, except for the above described aspects. Thus, in the present embodiment, it is possible to obtain advantages caused by common configurations with the second embodiment described above similar to the second embodiment.

Although, this embodiment is a modification based on the second embodiment, this embodiment may be combined with the first embodiment described above.

Fourth Embodiment

A fourth embodiment is described next. This embodiment is explained mainly with respect to points different from those of the first embodiment.

Figure 13:
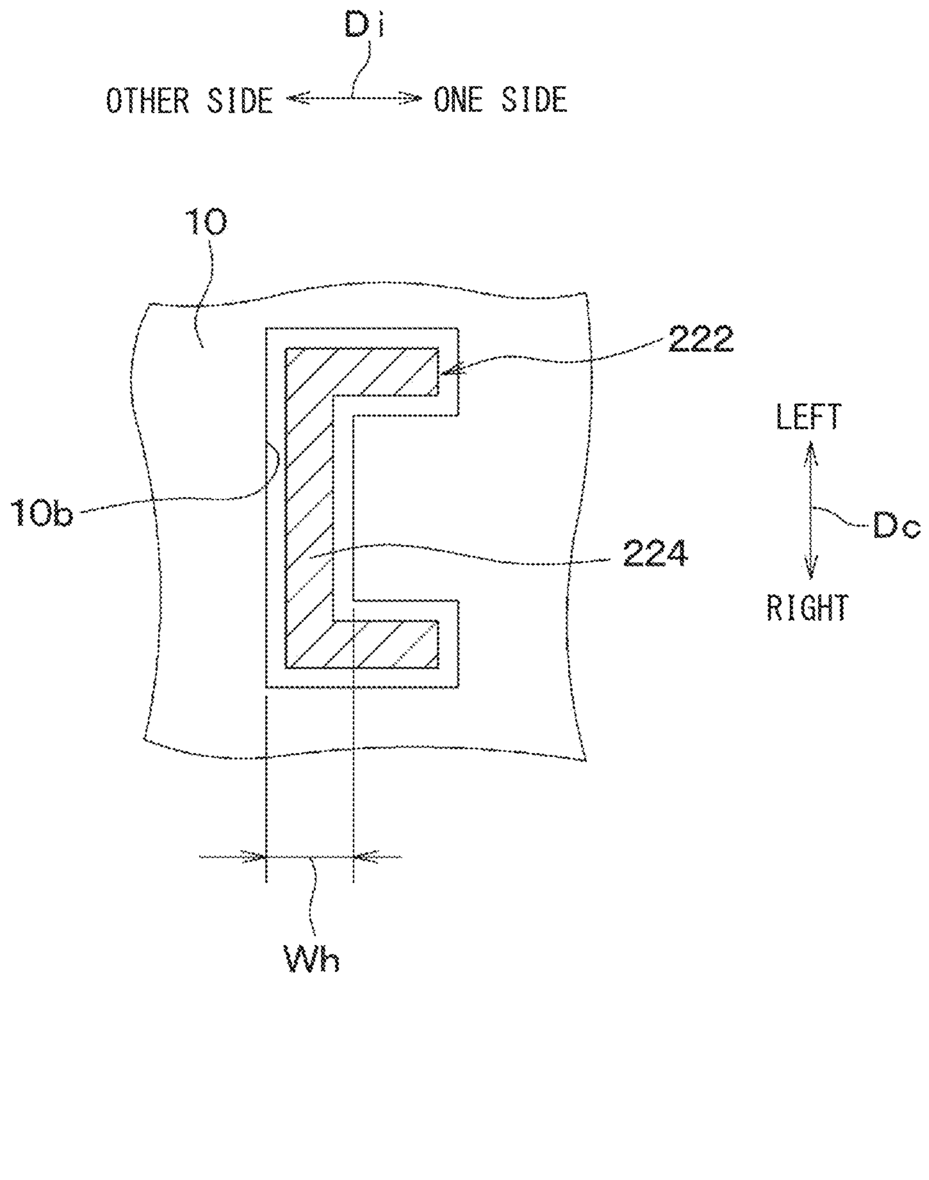
FIG. 13 is a cross-sectional view of a fourth embodiment, schematically illustrating a cross-section on a line V-V of FIG. 2, and corresponds to FIG. 5.

FIG. 13 shows a cross section perpendicular to the arc shape of the arc-shaped portion 224 included in the connection member 22. In the arc-shaped portion 224 of the present embodiment, the cross-sectional shape of the arc-shaped portion 224 is a shape recessed from one side to the other side in one direction Di along the transverse cross section of FIG. 13. For example, the one direction Di is a direction perpendicular to the axial direction of the pedal axis CL.

The insertion hole 10*b* of the housing 10 has a shape following the cross-sectional shape of the arc-shaped portion 224. For example, the insertion hole 10*b* is formed so as to provide a gap of equal width with respect to the arc-shaped portion 224 over the entire circumference of the arc-shaped portion 224.

(1) As described above, according to this embodiment, the cross-sectional shape of the arc-shaped portion 224 in the cross section of FIG. 13 is a shape recessed from one side to the other side in one direction Di along the cross section. Therefore, a hole width Wh of the insertion hole 10*b* of the housing 10 may be narrowed in one direction Di while the strength of the arc-shaped portion 224 is sufficiently ensured. This makes it easier to prevent foreign matter and the like from entering the housing 10 through the insertion hole 10*b*.

This embodiment is the same as the first embodiment, except for the above described aspects. Thus, in the present embodiment, it is possible to obtain advantages caused by common configurations with the first embodiment described above similar to the first embodiment.

Although, this embodiment is a modification based on the first embodiment, this embodiment may be combined with the second embodiment or the third embodiment described above.

Fifth Embodiment

A fifth embodiment is described next. This embodiment is explained mainly with respect to points different from those of the first embodiment.

Figure 14:
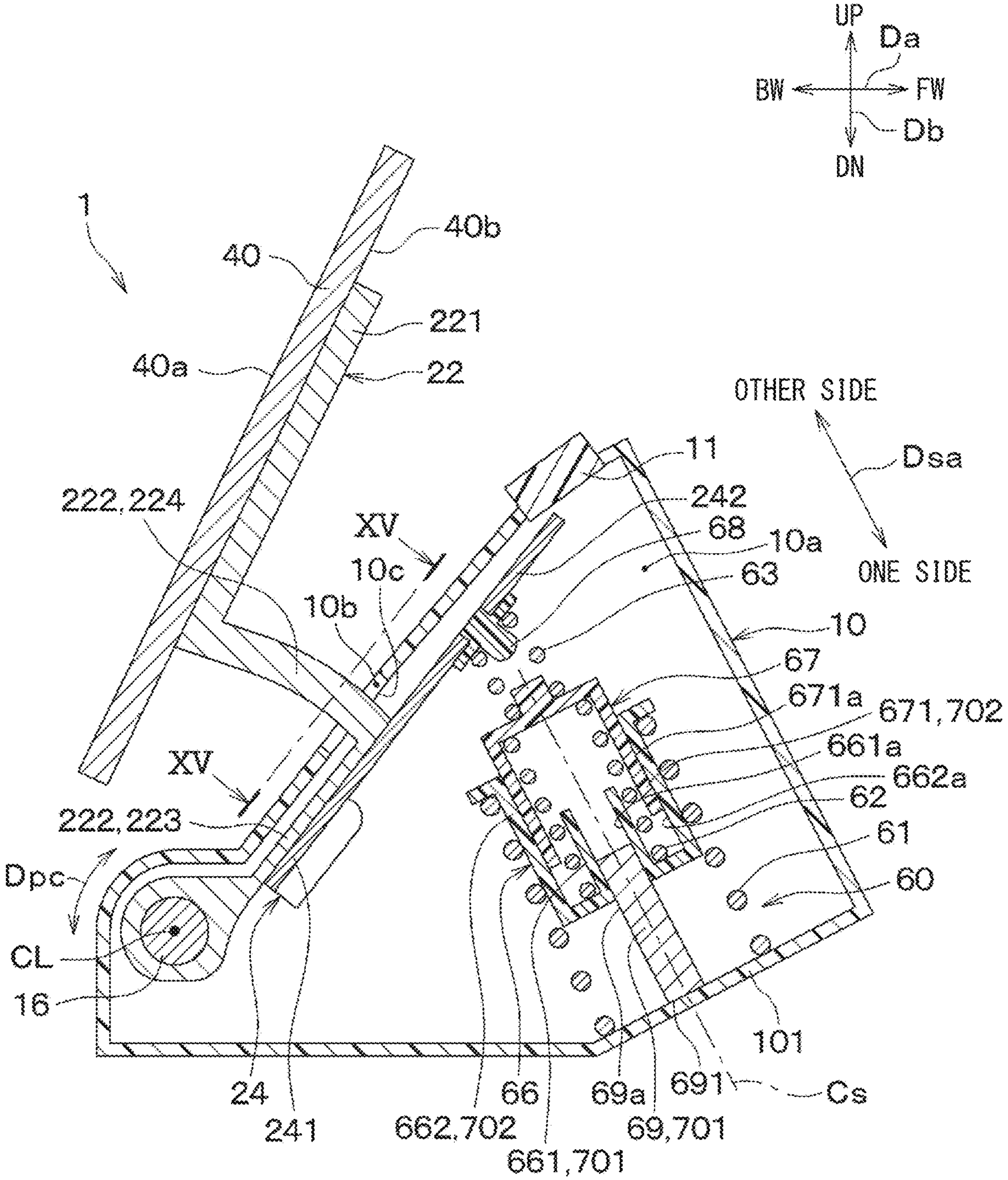
FIG. 14 is a cross-sectional view of a fifth embodiment, schematically illustrating a schematic configuration of the pedal device in a non-stepping motion state of a pedal, in a posture of a vehicle-mounted state, and corresponds to FIG. 2.
Figure 15:
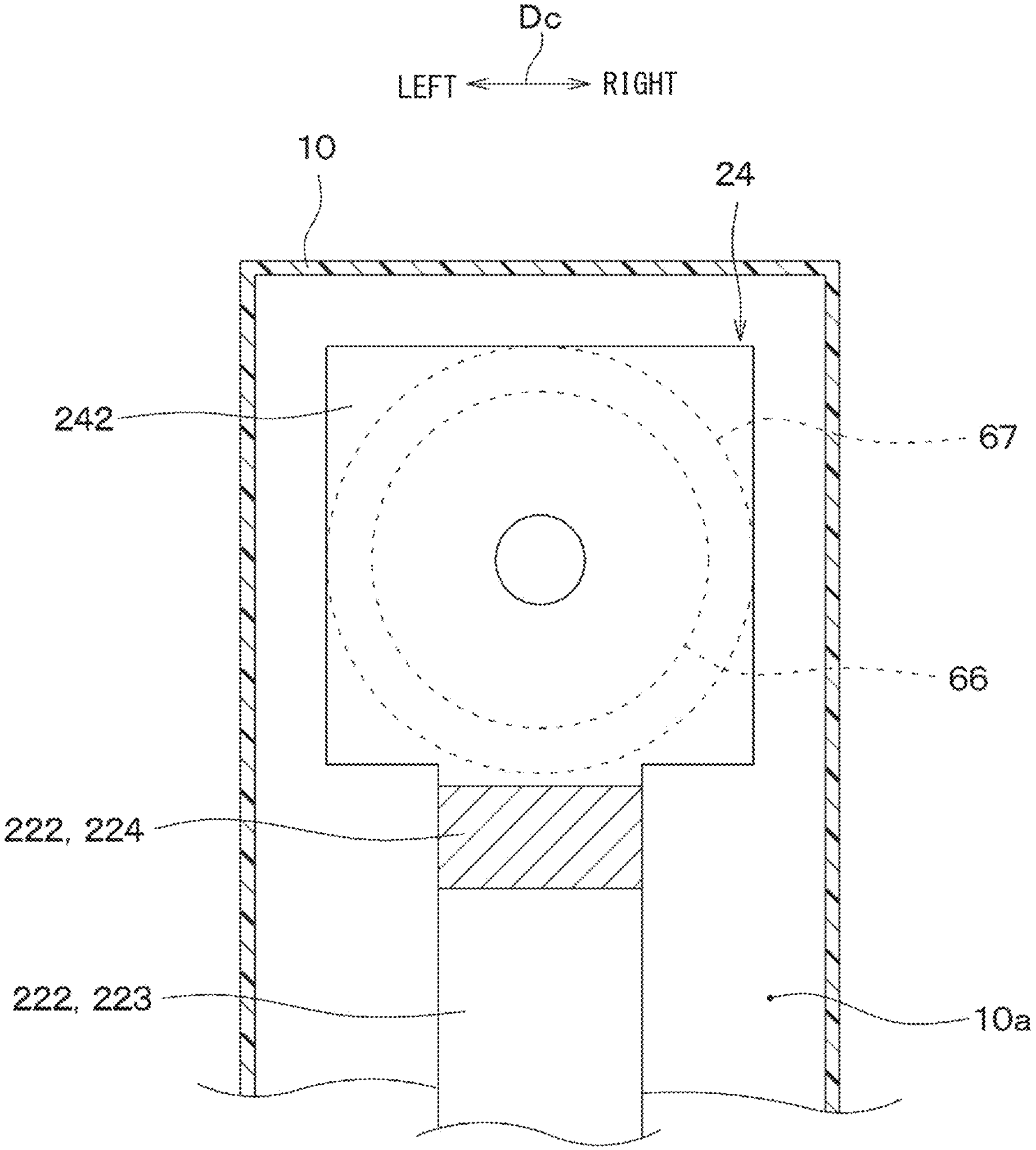
FIG. 15 is a cross-sectional view of the fifth embodiment, schematically illustrating a cross-section on a line XV-XV of FIG. 14, and also showing a cross-sectional view of the housing.

As shown in FIGS. 14 and 15, in the present embodiment, similarly to the first embodiment, the third retainer member 68 of the reaction force generator mechanism 60 is fixed to the member tip portion 242 of the transmission member 24. However, the shape of the member tip portion 242 is different from that of the first embodiment. FIG. 15 is a cross-sectional view on a line XV-XV of FIG. 14, the housing 10 is also shown in cross section in the same direction as the XV-XV cross section in FIG. 15.

Specifically, in this embodiment, the member tip portion 242 of the transmission member 24 is configured as a widened portion that is widened more than the reaction force generator mechanism 60 in the axial direction of the pedal axis center CL (i.e., the vehicle width direction Dc). For example, the member tip portion 242 is wider than the reaction force generator mechanism 60 over the entire circumference around the mechanism axis Cs. The member tip portion 242 serving as the widened portion is disposed within the housing 10 so as to overlap with the reaction force generator mechanism 60 on the upper side in the vehicle direction. This is also true regardless of positions of the pedal 40 within the movable range Rp of the pedal 40, and also true in both the vehicle-mounted state and the stored state of the pedal device 1.

(1) As described above, according to this embodiment, the transmission member 24 has the member tip portion 242 serving as a widened portion that is widened more than the reaction force generator mechanism 60 in the axial direction of the pedal axis CL. The member tip portion 242 is disposed within the housing 10 so as to overlap with the reaction force generator mechanism 60 on the upper side in the vehicle direction. Therefore, foreign matter or the like that has entered the housing 10 through the insertion hole 10*b* of the housing 10 is less likely to enter the reaction force generator mechanism 60.

This embodiment is the same as the first embodiment, except for the above described aspects. Thus, in the present embodiment, it is possible to obtain advantages caused by common configurations with the first embodiment described above similar to the first embodiment.

Although, the present embodiment is a modification based on the first embodiment, this embodiment may be combined with any of the second to the fourth embodiments described above.

Sixth Embodiment

A sixth embodiment is described next. This embodiment is explained mainly with respect to points different from those of the first embodiment.

Figure 16:
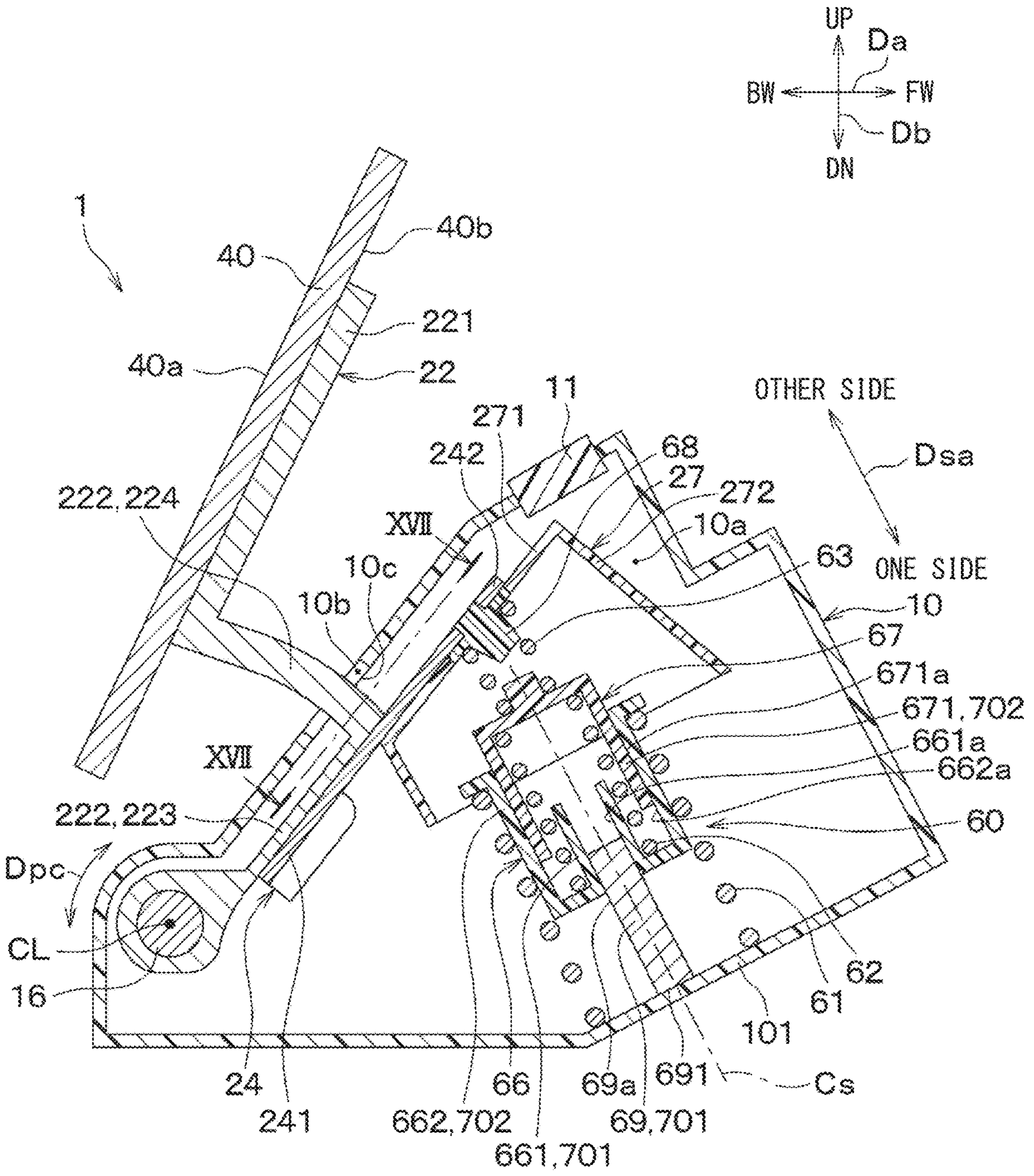
FIG. 16 is a cross-sectional view of a sixth embodiment, schematically illustrating a schematic configuration of the pedal device in a non-stepping motion state of a pedal, in a posture of a vehicle-mounted state, and corresponds to FIG. 2.
Figure 17:
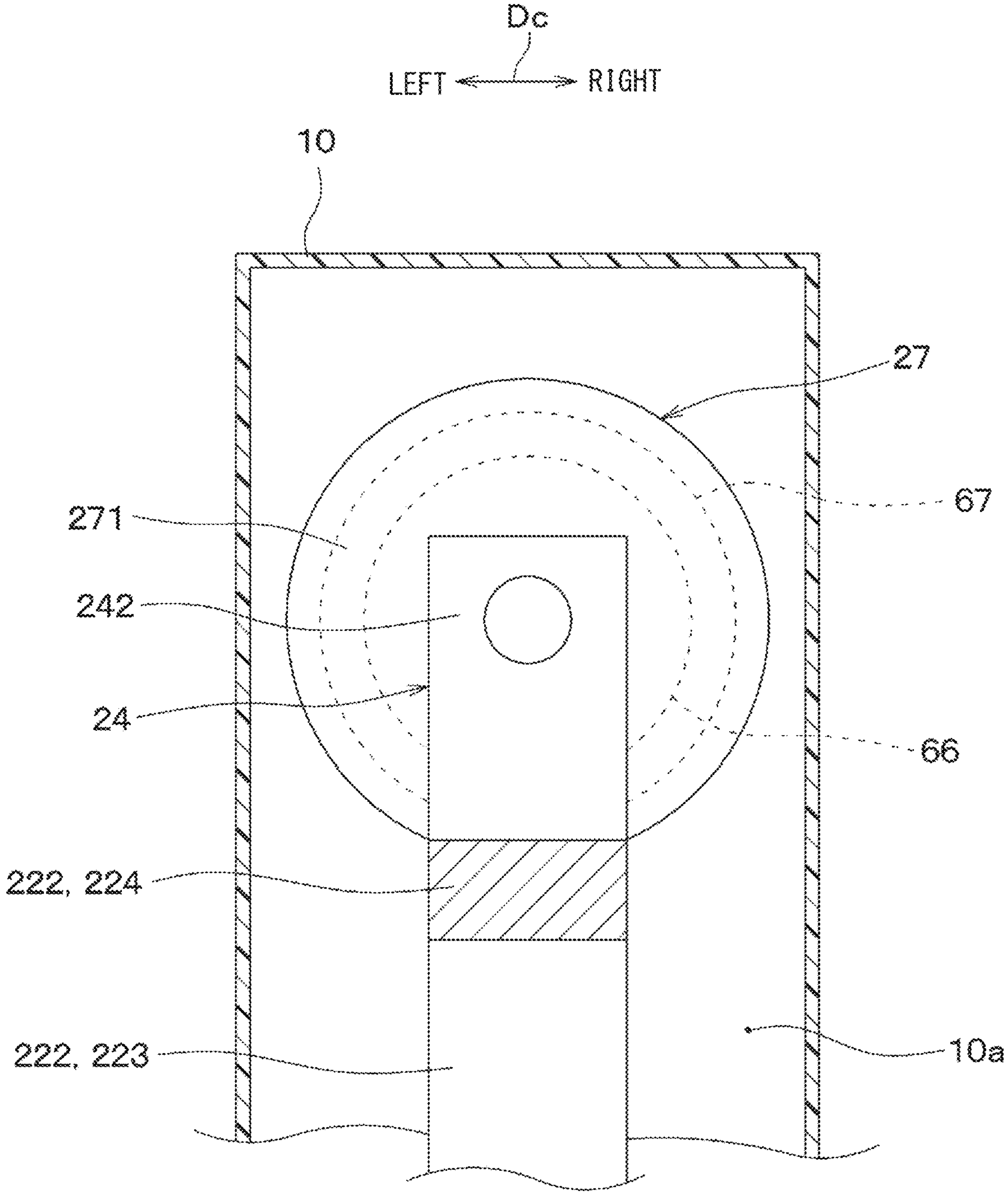
FIG. 17 is a cross-sectional view schematically illustrating a cross-sectional view on a line XVII-XVII in FIG. 16 in the sixth embodiment.

As shown in FIG. 16 and FIG. 17, the pedal device 1 of this embodiment includes a mechanism protection member 27 that is configured as a separate component from the transmission member 24. The present embodiment is different from the first embodiment in this point.

Specifically, the mechanism protection member 27 of the present embodiment has a widened portion 271 and a cylindrical portion 272. The widened portion 271 is fixed to the member tip portion 242 of the transmission member 24 together with the third retainer member 68 of the reaction force generator mechanism 60.

The widened portion 271 forms a disk shape that intersects with the mechanism axis Cs, and is widened more than the reaction force generator mechanism 60 in the axial direction of the pedal axis CL (i.e., the vehicle width direction Dc). For example, the widened portion 271 is widened more than the reaction force generator mechanism 60 over the entire circumference around the mechanism axis Cs. The widened portion 271 is disposed within the housing 10 so as to overlap with the reaction force generator mechanism 60 on the upper side in the vehicle direction. This is also true regardless of positions of the pedal 40 within the movable range Rp of the pedal 40, and also true in both the vehicle-mounted state and the stored state of the pedal device 1.

The cylindrical portion 272 of the mechanism protection member 27 has a cylindrical shape extending from the peripheral edge portion of the widened portion 271 to one side in the mechanism axial direction Dsa. For example, if the pedal 40 is in the non-stepping motion state, some component of the reaction force generator mechanism 60, such as the third retainer member 68 and the third spring 63 is placed inside the cylindrical portion 272.

(1) As described above, according to this embodiment, the widened portion 271 of the mechanism protecting member 27 is widened more than the reaction force generator mechanism 60 in the axial direction of the pedal axis CL. The widened portion 271 is fixed to the member tip portion 242 of the transmission member 24 and is disposed within the housing 10 so as to overlap with the reaction force generator mechanism 60 on the upper side in the vehicle direction. Therefore, foreign matter or the like that has entered the housing 10 through the insertion hole 10*b* of the housing 10 is less likely to enter the reaction force generator mechanism 60.

This embodiment is the same as the first embodiment, except for the above described aspects. Thus, in the present embodiment, it is possible to obtain advantages caused by common configurations with the first embodiment described above similar to the first embodiment.

Although, the present embodiment is a modification based on the first embodiment, this embodiment may be combined with any of the second to the fourth embodiments described above.

Seventh Embodiment

A seventh embodiment is described next. This embodiment is explained mainly with respect to points different from those of the first embodiment.

Figure 18:
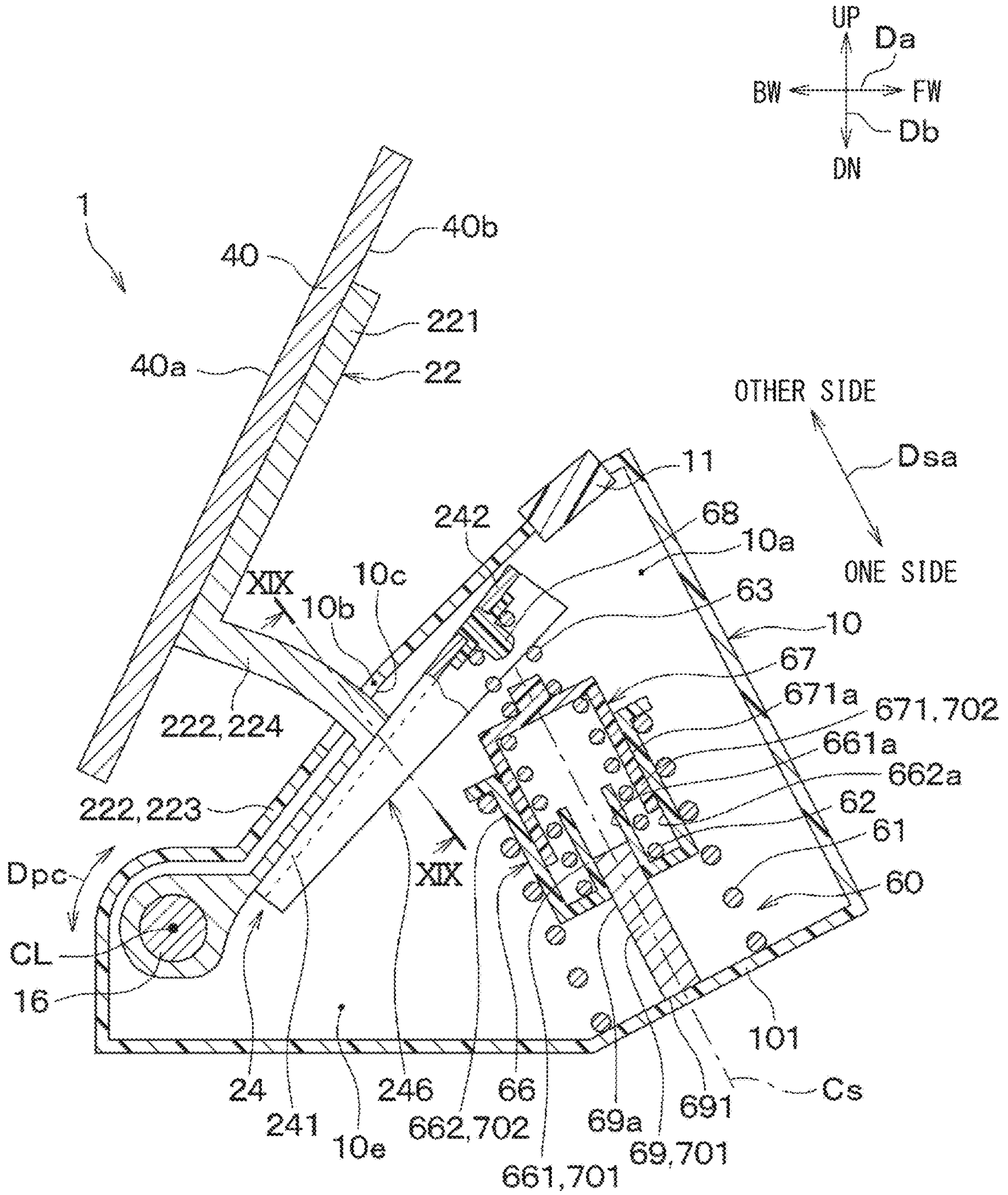
FIG. 18 is a cross-sectional view of a seventh embodiment, schematically illustrating a schematic configuration of the pedal device in a non-stepping motion state of a pedal, in a posture of a vehicle-mounted state, and corresponds to FIG. 2.
Figure 19:
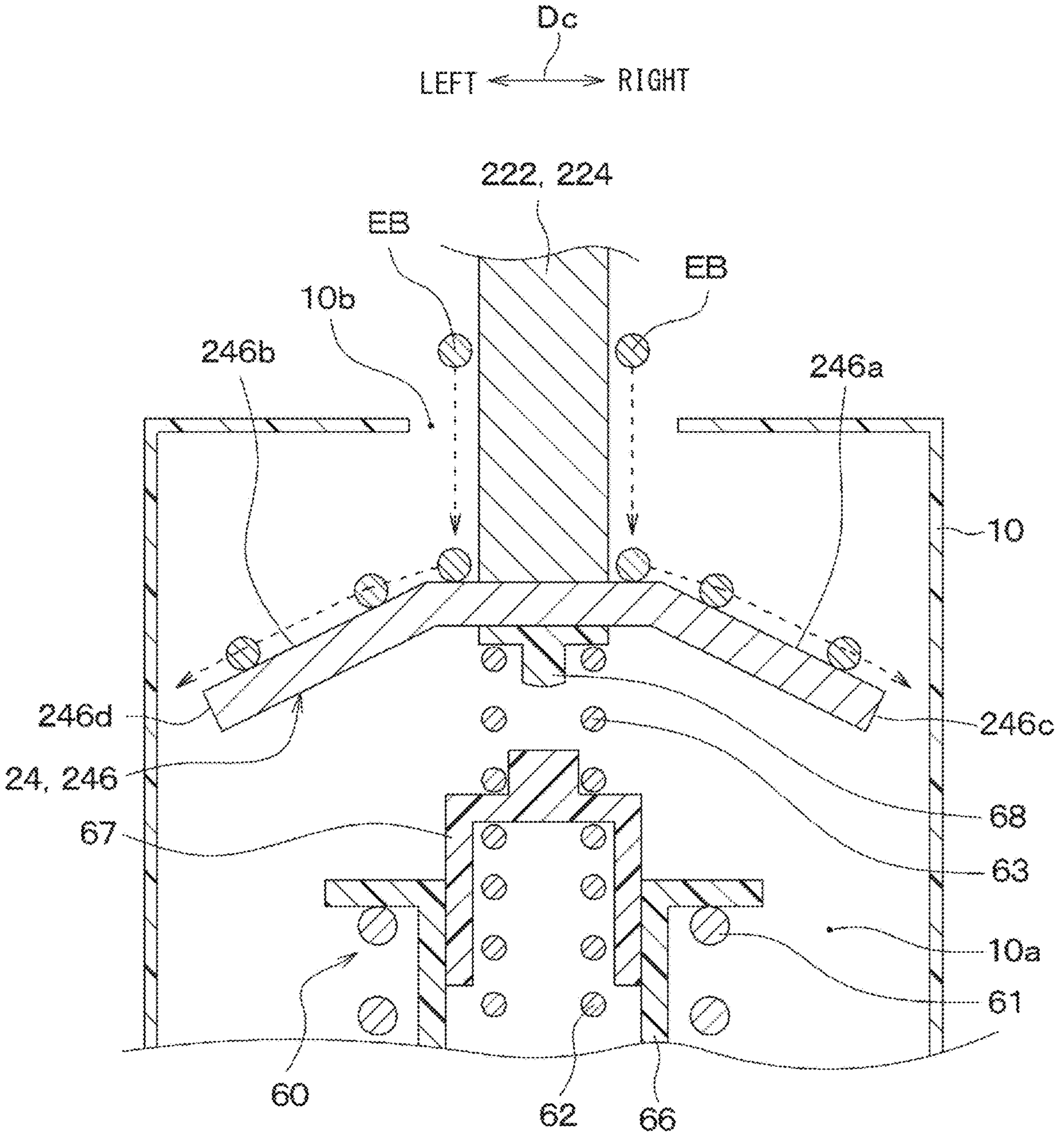
FIG. 19 is a cross-sectional view schematically illustrating a cross-sectional view on a line XIX-XIX in FIG. 18 in the seventh embodiment.

As shown in FIGS. 18 and 19, the transmission member 24 has a lower arrangement portion 246. The member base portion 241 of the transmission member 24 is included in this lower arrangement portion 246. In addition, in FIG. 18, the lower arrangement portion 246 of the transmission portion mounting member 24 is not shown in cross section.

The lower arrangement portion 246 is arranged so as to overlap the inner opening end 10*c* of the insertion hole 10*b* on a lower side in the vehicle direction regardless of positions of the pedal 40 within the movable range Rp of the pedal 40. The lower arrangement portion 246 has a pair of inclined surfaces 246*a* and 246*b* provided on opposite sides of the inner opening end 10*c*. The pair of inclined surfaces 246*a* and 246*b* are disposed on both sides of the lower arrangement portion 246 in the axial direction of the pedal axis CL (i.e., the vehicle width direction Dc).

The pair of inclined surfaces 246*a* and 246*b* extend to end edges 246*c* and 246*d* of the lower arrangement portion 246 in the axial direction of the pedal axis CL, and are inclined so as to be positioned lower in the vehicle direction as they approach the end edges 246*c* and 246*d*.

Furthermore, the pair of inclined surfaces 246*a* and 246*b* are not limited to the lower arrangement portion 246 but extend to the member tip portion 242 of the transmission member 24. For example, the pair of inclined surfaces 246*a* and 246*b* are provided over the entire length of the transmission member 24 in a view along the pedal axis CL. Therefore, the pair of inclined surfaces 246*a* and 246*b* extends around the third retainer member 68 of the reaction force generator mechanism 60, and the third retainer member 68 is inserted between the pair of inclined surfaces 246*a* and 246*b*.

The above-described arrangement and shape of the lower arrangement portion 246 and the pair of inclined surfaces 246*a* and 246*b* are the same not only in the vehicle-mounted state of the pedal device 1, but also in the stored state.

(1) As described above, according to this embodiment, the lower arrangement portion 246 of the transmission member 24 is disposed to overlap the lower side in the vehicle direction, of the inner opening end 10*c* of the insertion hole 10*b*. The lower arrangement portion 246 has a pair of inclined surfaces 246*a* and 246*b* provided on opposite sides of the inner opening end 10*c*. The pair of inclined surfaces 246*a* and 246*b* extend to end edges 246*c* and 246*d* of the lower arrangement portion 246 in the axial direction of the pedal axis CL, and are inclined so as to be positioned lower in the vehicle direction as they approach the end edges 246*c* and 246*d*.

Therefore, if the foreign matter EB enters the housing 10 through the insertion hole 10*b*, e.g., due to the effect of gravity, the foreign matter EB may move on the inclined surfaces 246*a* and 246*b* and be collected to both ends in the vehicle width direction Dc at the bottom 10*e* of the housing cavity 10*a*, as shown by the dashed arrows in FIG. 19. This makes it difficult for the foreign matter EB that has fallen to the bottom 10*e* of the housing cavity 10*a* to reach the reaction force generator mechanism 60 that is disposed approximately in the center of the housing cavity 10*a* in the vehicle width direction Dc.

This embodiment is the same as the first embodiment, except for the above described aspects. Thus, in the present embodiment, it is possible to obtain advantages caused by common configurations with the first embodiment described above similar to the first embodiment.

Although, the present embodiment is a modification based on the first embodiment, this embodiment may be combined with any of the second to the sixth embodiments described above.

Eighth Embodiment

An eighth embodiment is described next. This embodiment is explained mainly with respect to points different from those of the first embodiment.

Figure 20:
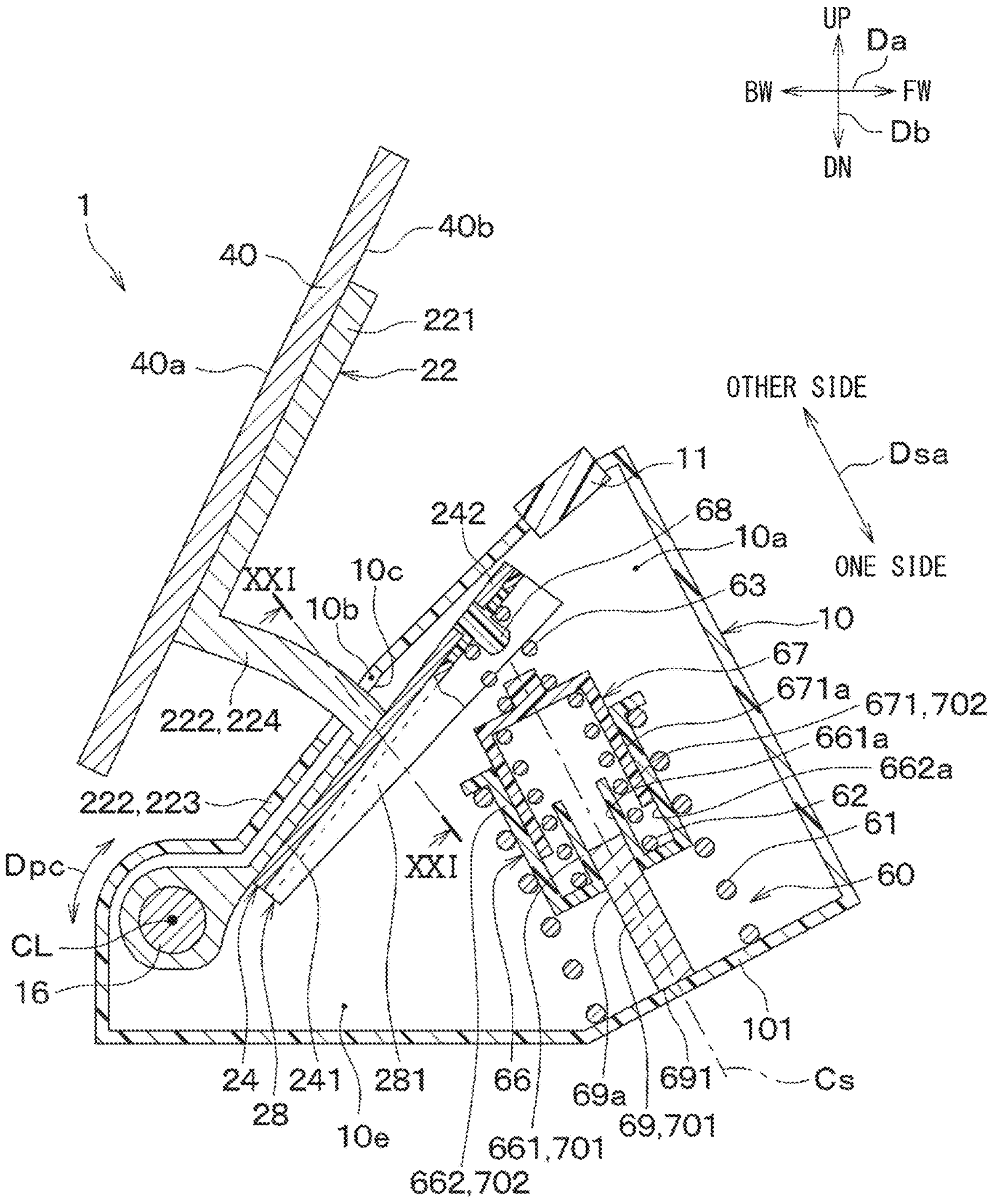
FIG. 20 is a cross-sectional view of an eighth embodiment, schematically illustrating a schematic configuration of the pedal device in a non-stepping motion state of a pedal, in a posture of a vehicle-mounted state, and corresponds to FIG. 2.
Figure 21:
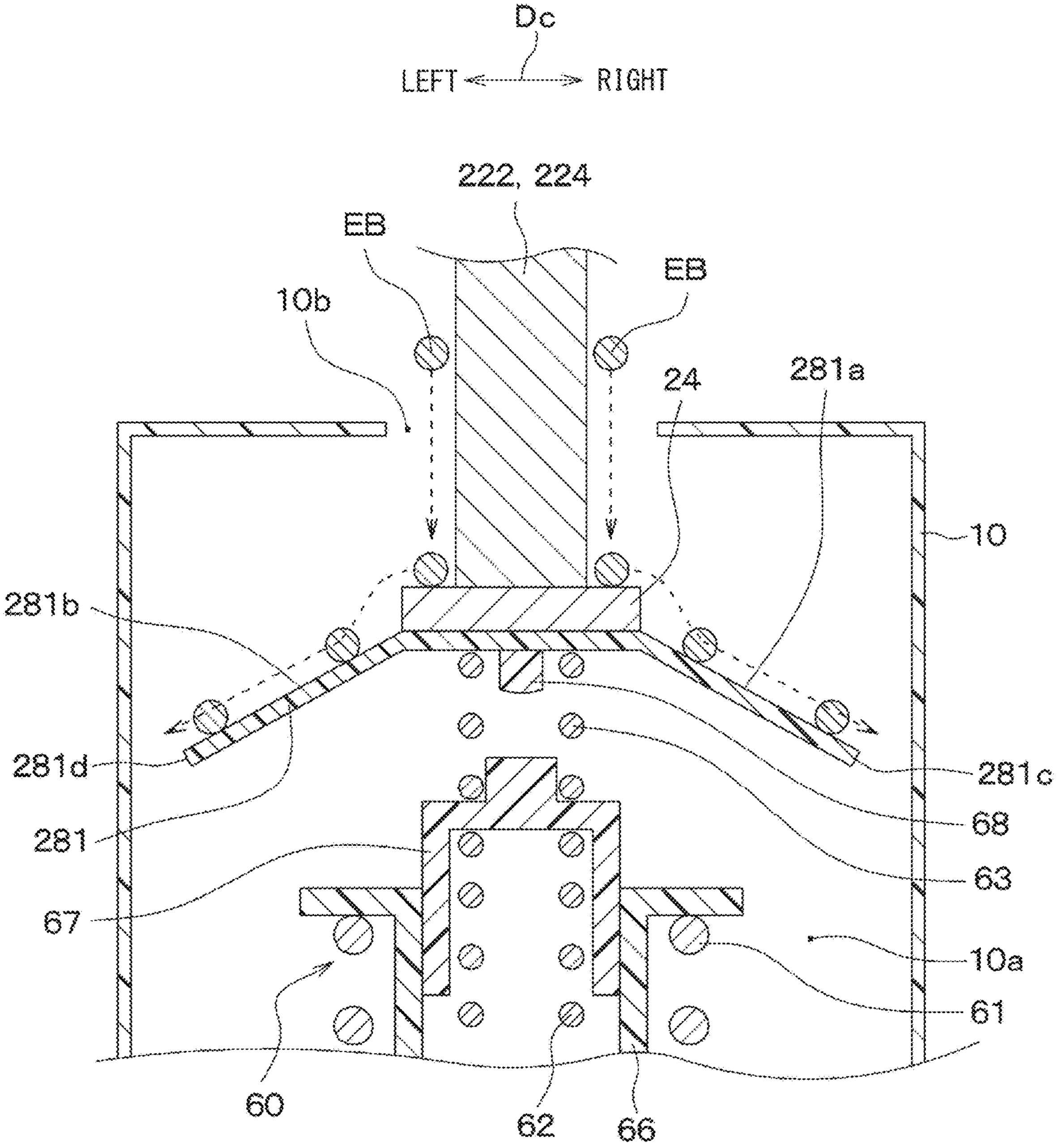
FIG. 21 is a cross-sectional view schematically illustrating a cross-sectional view on a line XXI-XXI in FIG. 20 in the eighth embodiment.

As shown in FIGS. 20 and 21, the pedal device 1 of this embodiment includes a transmission portion mounted member 28 that is configured as a separate component from the transmission member 24. The present embodiment is different from the first embodiment in this point.

Specifically, the transmission portion mounted member 28 is disposed within the housing 10 and is fixed to the transmission member 24. The transmission portion mounted member 28 extends along the transmission member 24 over the entire length of the transmission member 24 in a view along the pedal axis CL.

In addition, the transmission portion mounted member 28 has a lower arrangement portion 281. The lower arrangement portion 281 is arranged so as to overlap the inner opening end 10*c* of the insertion hole 10*b* on a lower side in the vehicle direction regardless of positions of the pedal 40 within the movable range Rp of the pedal 40. In addition, in FIG. 20, the lower arrangement portion 281 of the transmission portion mounted member 28 is not shown in cross section.

The lower arrangement portion 281 has a pair of inclined surfaces 281*a* and 281*b* provided on opposite sides of the inner opening end 10*c*. The pair of inclined surfaces 281*a* and 281*b* are disposed on both sides of the lower arrangement portion 281 in the axial direction of the pedal axis CL (i.e., the vehicle width direction Dc).

The pair of inclined surfaces 281*a* and 281*b* extend to end edges 281*c* and 281*d* of the lower arrangement portion 281 in the axial direction of the pedal axis CL, and are inclined so as to be positioned lower in the vehicle direction as they approach the end edges 281*c* and 281*d*.

Furthermore, the pair of inclined surfaces 281*a* and 281*b* are not limited to the lower arrangement portion 281, but extend over an entire length of the transmission portion mounted member 28 in a view along the pedal axis CL. Therefore, the pair of inclined surfaces 281*a* and 281*b* extends around the third retainer member 68 of the reaction force generator mechanism 60, and the third retainer member 68 is inserted between the pair of inclined surfaces 281*a* and 281*b*.

The above-described arrangement and shape of the lower arrangement portion 281 and the pair of inclined surfaces 281*a* and 281*b* are the same not only in the vehicle-mounted state of the pedal device 1, but also in the stored state.

(1) As described above, according to this embodiment, the lower arrangement portion 281 of the transmission portion mounted member 28 fixed to the transmission member 24 is disposed to overlap the lower side in the vehicle direction with respect to the inner opening end 10*c* of the insertion hole 10*b*. The lower arrangement portion 281 has a pair of inclined surfaces 281*a* and 281*b* provided on opposite sides of the inner opening end 10*c*. The pair of inclined surfaces 281*a* and 281*b* extend to end edges 281*c* and 281*d* of the lower arrangement portion 281 in the axial direction of the pedal axis CL, and are inclined so as to be positioned lower in the vehicle direction as they approach the end edges 281*c* and 281*d*.

Therefore, if the foreign matter EB enters the housing 10 through the insertion hole 10*b*, the foreign matter EB may move on the inclined surfaces 281*a* and 281*b* and be collected to both ends in the vehicle width direction Dc at the bottom 10*e* of the housing cavity 10*a*, as shown by the dashed arrows in FIG. 21. This makes it difficult for the foreign matter EB that has fallen to the bottom 10*e* of the housing cavity 10*a* to reach the reaction force generator mechanism 60 that is disposed approximately in the center of the housing cavity 10*a* in the vehicle width direction Dc.

This embodiment is the same as the first embodiment, except for the above described aspects. Thus, in the present embodiment, it is possible to obtain advantages caused by common configurations with the first embodiment described above similar to the first embodiment.

Although, the present embodiment is a modification based on the first embodiment, this embodiment may be combined with any of the second to the sixth embodiments described above.

Ninth Embodiment

A ninth embodiment is described next. The present embodiment is explained primarily with respect to portions different from those of the seventh embodiment.

Figure 22:
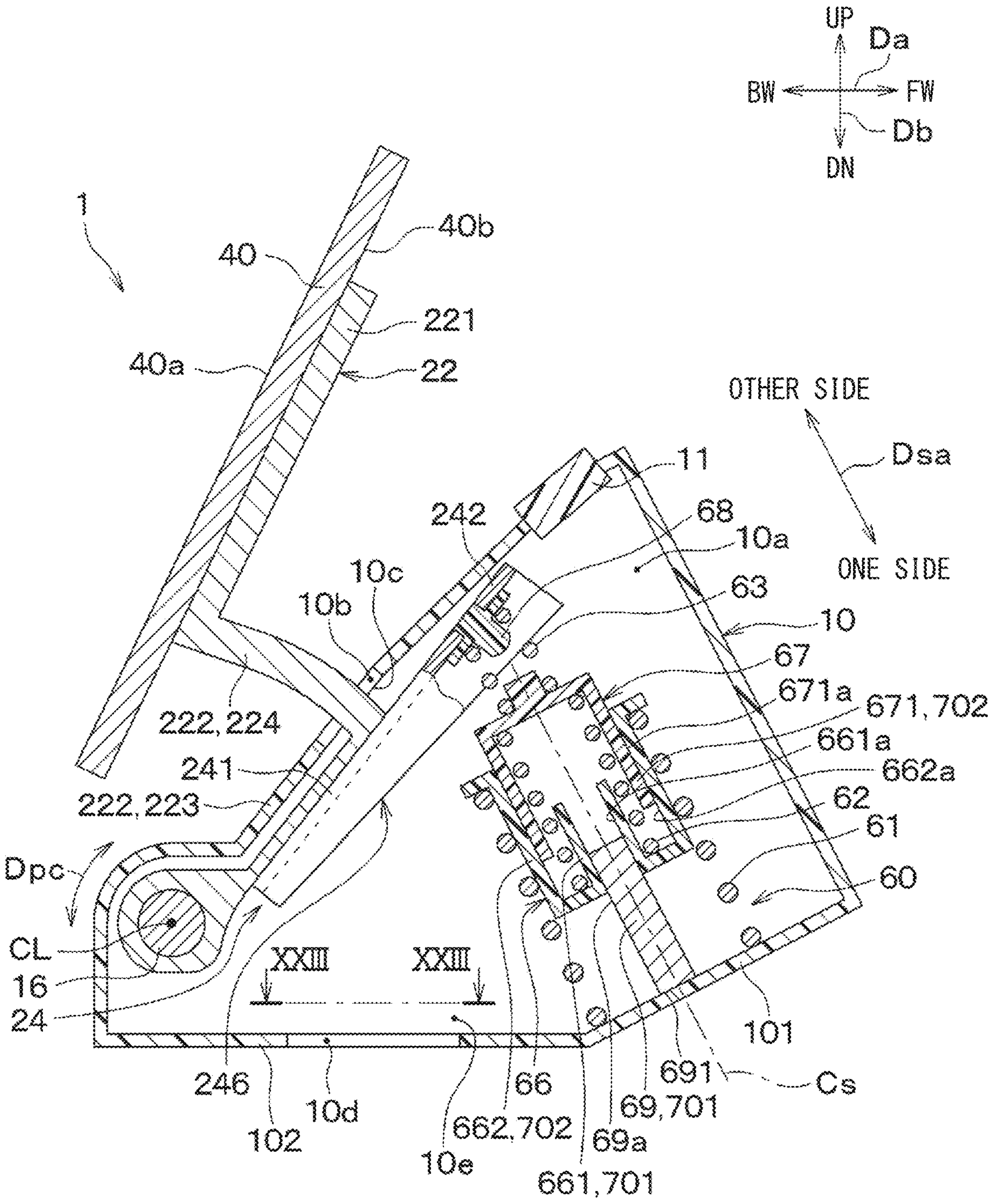
FIG. 22 is a cross-sectional view of a ninth embodiment, schematically illustrating a schematic configuration of the pedal device in a non-stepping motion state of a pedal, in a posture of a vehicle-mounted state, and corresponds to FIG. 2.
Figure 23:
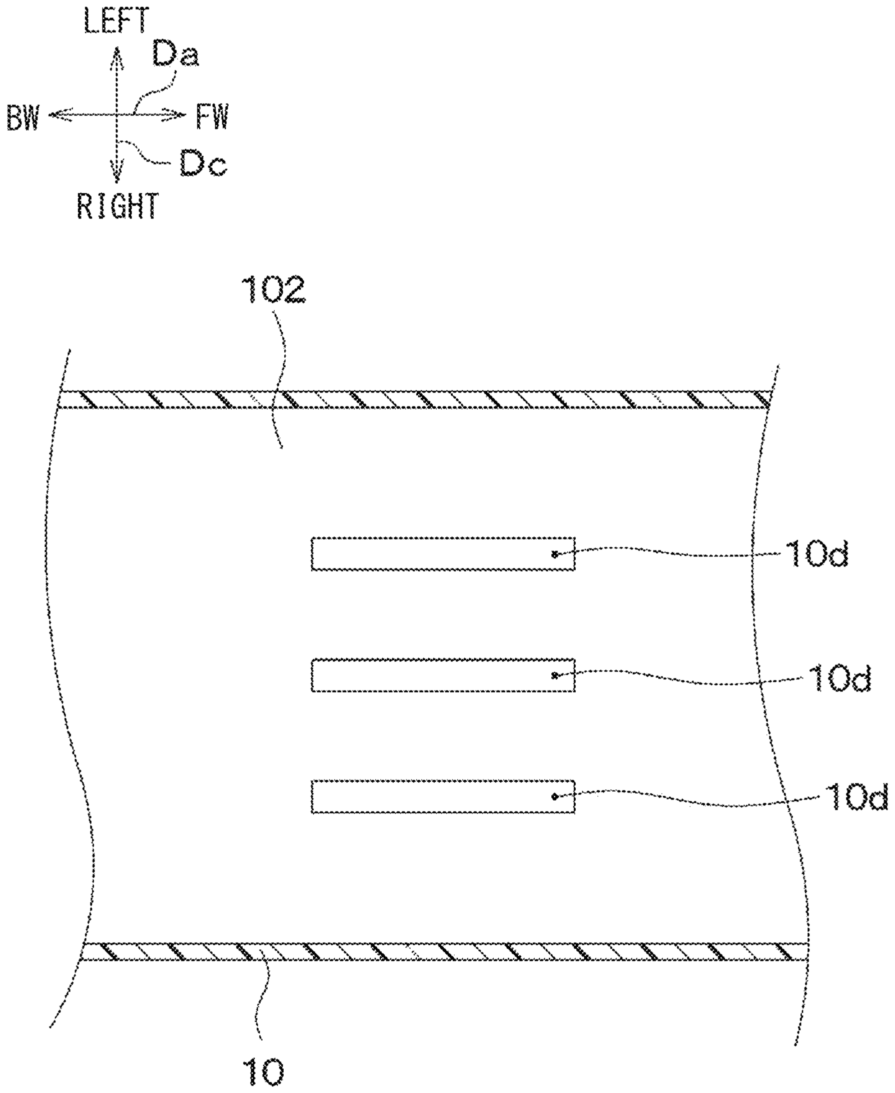
FIG. 23 is a cross-sectional view schematically illustrating a cross-sectional view on a line XXIII-XXIII in FIG. 22 in the ninth embodiment.

As shown in FIG. 22 and FIG. 23, the housing 10 is formed with a plurality of lower communication holes 10*d*. For example, the lower communication hole 10*d* is formed in a bottom portion 102 that constitutes the bottom of the housing 10 in the vehicle-mounted state of the pedal device 1. Therefore, the lower communication hole 10*d* opens and faces upward in the vehicle direction or diagonally upward in the vehicle direction to the housing cavity 10*a* and opens and faces downward in the vehicle direction or diagonally downward in the vehicle direction to the outside of the housing 10. The lower communication hole 10*d* communicates between a bottom portion 10*e* of the housing cavity 10*a* that is located on the lower side in the vehicle direction and the outside of the housing 10.

A plurality of the lower communication holes 10*d* of the housing 10 are arranged along a line at intervals in the vehicle width direction Dc and each has a slit shape extending in the vehicle forward-and-backward direction Da. The housing 10 is attached to the vehicle side so that the lower communication hole 10*d* is not blocked by external parts around the housing 10 in the vehicle-mounted state of the pedal device 1.

(1) As described above, according to this embodiment, the housing 10 is formed with the lower communication hole 10*d*, and the lower communication hole 10*d* communicates between the bottom 10*e* of the housing cavity 10*a* and the outside of the housing 10. Therefore, water, foreign matter, etc. that has entered the housing cavity 10*a* can easily be discharged to the outside of the housing 10 through the lower communication hole 10*d*, making it possible to prevent the water, foreign matter, etc. from accumulating in the housing cavity 10*a*.

This embodiment is the same as the seventh embodiment, except for the above described aspects. Thus, in the present embodiment, it is possible to obtain advantages caused by common configurations with the seventh embodiment described above similar to the seventh embodiment.

Although the present embodiment is a modification based on the seventh embodiment, the present embodiment may be combined with any of the first to sixth, and eighth embodiments described above.

Other Embodiments (1) In each of the embodiments described above, the pedal device 1 is used as a brake pedal device, but this is an example. For example, the pedal device 1 may be used as an accelerator pedal device operated to adjust an output of a drive source of the vehicle 80. Furthermore, the pedal device 1 can be various devices operated by the driver 81 with a foot.

(2) In each of the above-described embodiments, the rotation angle sensor 79 is disposed inside the housing 10 as shown in FIG. 3. However, this is merely an example. For example, the pedal device 1 does not necessarily have to include the rotation angle sensor 79.

Alternatively, the pedal device 1 may be disposed with various physical quantity sensors that detect physical quantities related to an operation of stepping motion of the driver 81 on the pedal 40 in addition to or instead of the rotation angle sensor 79, and the physical quantity sensors may be provided within the housing 10. In such a case, it is preferable that the opening end lower area Ru and the flow-down portion lower area Rw do not overlap with the physical quantity sensor in the non-stepping motion state of the pedal 40 in the vehicle-mounted state of the pedal device 1. This is also true in a state where the pedal 40 is in the fully stepping motion state and in the stored state of the pedal device 1.

(3) In each of the above-described embodiments, for example as shown in FIG. 2, the pedal device 1 does not have a cam mechanism that links components together via a cam. However, it is also acceptable for the pedal device 1 to have such a cam mechanism, which may be disposed in the housing 10. In such a case, it is preferable that the opening end lower area Ru and the flow-down portion lower area Rw do not overlap with the sliding portion of the cam mechanism that slides in conjunction with the swinging motion of the pedal 40 in the non-stepping motion state of the pedal 40 in the vehicle-mounted state of the pedal device 1. This is also true in a state where the pedal 40 is in the fully stepping motion state and in the stored state of the pedal device 1.

(4) In the above-described first embodiment, the posture of the pedal device 1 in the vehicle-mounted state is shown in FIG. 2, but it may be in a posture different from that shown in FIG. 2, for example, tilted with respect to the posture shown in FIG. 2.

The same is true for a posture of the pedal device 1 in the stored state. That is, the posture of the pedal device 1 in the stored state is as shown in FIG. 7, but it may be in a posture different from that shown in FIG. 7, for example, tilted with respect to the posture shown in FIG. 7.

(5) In each of the above-described embodiments, e.g., as shown in FIG. 2, the elastic bodies of the reaction force generator mechanism 60 are the first to third springs 61, 62 and 63 which are specifically coil springs. However, this is merely an example. For example, it is conceivable that the elastic body of the reaction force generator mechanism 60 may be not a coil spring, but rather a rubber or air spring, or the like.

(6) In the above-described first embodiment, as shown in FIGS. 2, 6 and 7, the opening end lower area Ru does not overlap with the rotation angle sensor 79, the sliding portion, and the mechanism-specific portion, in both the vehicle-mounted state and the stored state of the pedal device 1. However, this is just one example. The opening end lower area Ru does not overlap with the rotation angle sensor 79, the sliding portion, and the mechanism-specific portion. It may be assumed that this relationship may be satisfied in one and may not be satisfied in the other one of the vehicle-mounted state and the stored state. The same may apply to the flow-down portion lower area Rw.

(7) The present disclosure is not limited to the above-described embodiment, and may be implemented in various modifications. In addition, the embodiments described above are not unrelated to each other, and may be appropriately combined unless the combination is obviously impossible.

Individual elements or features of a particular embodiment are not necessarily essential unless it is specifically stated that the elements or the features are essential in the foregoing description, or unless the elements or the features are obviously essential in principle. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Further, in each of the embodiments described above, when referring to the material, shape, positional relationship, and the like of the components and the like, except in the case where the components are specifically specified, and in the case where the components are fundamentally limited to a specific material, shape, positional relationship, and the like, the components are not limited to the material, shape, positional relationship, and the like.

VARIOUS ASPECTS OF PRESENT DISCLOSURE

The present disclosure described above can be understood from the following features, for example.

First Aspect

An organ-type pedal device (1) to be mounted in a vehicle (80), comprising:

- a housing (10);
- a pedal (40) connected to the housing so as to be able to swing about a pedal axis (CL) as a center and positioned to be operated by stepping motion of a driver (81) from a side opposite to the housing;
- a reaction force generator mechanism (60) that is disposed within the housing and includes elastic member (61, 62, 63) that generate a reaction force against a stepping force applied to the pedal by the driver in response to a swing motion of the pedal;
- a stepping force transmission member (24) that is disposed within the housing, is connected to the reaction force generator mechanism, and deflects the elastic member by the stepping force received from the pedal; and
- a connection member (222) that connects the pedal and the stepping force transmission member so that the pedal and the stepping force transmission member move integrally, wherein
- the housing has an insertion hole (10*b*) through which the connection member is inserted, and wherein
- the insertion hole has an inner opening end (10*c*) that opens toward an inside of the housing, and wherein
- the inner opening end faces downward or obliquely downward in a predetermined state in which the pedal device is stored or mounted on a vehicle, and wherein
- the insertion hole is arranged so that an opening end lower area (Ru) obtained by extending an inner opening end downward along a predetermined state up-and-down direction (Db, D1*b*), which is an up-and-down direction in the predetermined state, does not overlap with a sensor (79), a sliding portion (16*a*, 16*b*, 18*a*, 19*a*, 69*a*, 661*a*, 662*a*, 671*a*, 12*a*, 243*a*, 223*c*, 245) where members slide against each other as the pedal swings, and a mechanism-specific portion (61, 62, 63) where members of the reaction force generator mechanism adjacent via a gap (Cb) are displaced against each other as the pedal swings.

Second Aspect

The pedal device according to the first aspect, wherein

- the connection member is formed so that, regardless of positions of the pedal within a movable range (Rp) of the pedal, a flow-down portion lower area (Rw) obtained by extending a flow-down portion (222*a*) of the connection member, where water flows down due to the gravity while traveling from within the insertion hole along the connection member, downward along the predetermined state up-and-down direction does not overlap with the sensor, the sliding portion, and the mechanism-specific portion.

Third Aspect

The pedal device according to the first or second aspect, wherein

- the reaction force generator mechanism has a coil spring (61, 62, 63) as the elastic member, and wherein
- the coil spring corresponds to the mechanism-specific portion.

Fourth Aspect

The pedal device according to the third aspect, wherein

- the reaction force generator mechanism has a guide portion (701, 702) that restrict a posture of the coil spring while allowing the coil spring to expand and contract.

Fifth Aspect

The pedal device according to the first or second aspect, wherein

- the reaction force generator mechanism includes a coil spring (61, 62, 63) as the elastic member, an outer cylindrical portion (661, 662), and an inner insertion portion (671, 69) inserted into the outer cylindrical portion, and wherein
- the outer cylindrical portion and the inner insertion portion slide relative to each other while fitting together as the coil spring expands and contracts, and wherein
- the coil spring corresponds to the mechanism-specific portion, and wherein
- the outer cylindrical portion and the inner insertion portion have respective sliding surfaces (69*a*, 661*a*, 662*a*, 671*a*) which corresponds to the sliding portion.

Sixth Aspect

The pedal device according to any one of the first to fifth aspects, further comprising:

- a pedal support portion (16) disposed within the housing and supported so as to be able to swing relative to the housing and to rotate integrally with the pedal, wherein
- the connection member not only connects the pedal and the stepping force transmission member but also connects the pedal and the pedal support portion, and wherein
- a portion (16*a*, 16*b*) of the pedal support portion that slides in response to the swing motion of the pedal corresponds to the sliding portion.

Seventh Aspect

The pedal device according to any one of the first to sixth aspects, wherein

- the stepping force transmission member has a supported portion (243) supported within the housing so as to be able to swing relative to the housing about another axis (C1) as a center different from the pedal axis, and wherein
- the supported portion has a portion (243*a*) which slides in response to the swing motion of the pedal and corresponds to the sliding portion.

Eighth Aspect

The pedal device according to any one of the first to seventh aspects, further comprising:

a link mechanism (25) arranged in the housing to link members together, wherein the link mechanism has a portion (23*c*, 245) which slides in response to the swing motion of the pedal and corresponds to the sliding portion.

Ninth Aspect

The pedal device according to any one of the first to eighth aspects, wherein the insertion hole is positioned so that the opening end lower area does not overlap with the sensor, the sliding portion, and the mechanism-specific portion regardless of positions of the pedal within a movable range (Rp) of the pedal.

Tenth Aspect

The pedal device according to any one of the first to ninth aspects, wherein the connection member has an arc-shaped portion (224) that moves in a circumferential direction (Dpc) of the pedal axis while passing through the insertion hole in accordance with swing motion of the pedal, and wherein the arc-shaped portion extends so as to form an arc shape centered on the pedal axis.

Eleventh Aspect

The pedal device according to the tenth aspect, wherein the arc-shaped portion has a cross-sectional shape of the arc-shaped portion on a cross section perpendicular to the arc shape is a shape recessed from one side to the other side in one direction (Di) along the cross section.

Twelfth Aspect

The pedal device according to any one of the first to eleventh aspects, wherein the stepping force transmission member has a widened portion (242) that is widened in an axial direction (Dc) of the pedal axis more than the reaction force generator mechanism, and wherein the widened portion is positioned within the housing so as to overlap an upper side of the reaction force generator mechanism in the predetermined state up-and-down direction.

Thirteenth Aspect

The pedal device according to any one of the first to eleventh aspects, further comprising:

a widened portion (271) which is configured as a separate component from the stepping force transmission member and is widened in an axial direction (Dc) of the pedal axis more than the reaction force generator mechanism, wherein the widened portion is fixed to the stepping force transmission member and is positioned within the housing so as to overlap an upper side of the reaction force generator mechanism in the predetermined state up-and-down direction.

Fourteenth Aspect

The pedal device according to any one of the first to thirteenth aspects, wherein the stepping force transmission member has a lower arrangement portion (246) arranged to overlap a lower side of the inner opening end, and wherein the lower arrangement portion has inclined surfaces (246*a*, 246*b*) provided on opposite sides to the inner opening end, and wherein the inclined surface extends to an end edge (246*c*, 246*d*) of the lower arrangement portion in an axial direction (Dc) of the pedal axis, and inclines so as to be positioned lower as it approaches the end edge.

Fifteenth Aspect

The pedal device according to any one of the first to thirteenth aspects, further comprising:

a lower arrangement portion (281) which is configured as a separate component from the stepping force transmission member, is fixed to the stepping force transmission member, and is arranged within the housing so as to overlap the lower side with respect to the inner opening end, wherein the lower arrangement portion has inclined surfaces (281*a*, 281*b*) provided on opposite sides to the inner opening end, and wherein the inclined surface extends to an end edge (281*c*, 281*d*) of the lower arrangement portion in the axial direction (Dc) of the pedal axis, and inclines so as to be positioned lower as it approaches the end edge.

Sixteenth Aspect

The pedal device according to any one of the first to fifteenth aspects, wherein the housing is formed with a lower communication hole (10*d*) that connects a bottom (10*e*) located on a lower side of a cavity (10*a*) of the housing to an outside of the housing.

What is claimed is:

1. A pedal device with an organ-type shape to be mounted in a vehicle, comprising:

a housing;

a pedal connected to the housing so as to be able to swing about a pedal axis as a center and positioned to be operated by stepping motion of a driver from a side opposite to the housing;

a reaction force generator mechanism that is disposed within the housing and includes an elastic member that generate a reaction force against a stepping force applied to the pedal by the driver in response to a swing motion of the pedal;

a stepping force transmission member that is disposed within the housing, is connected to the reaction force generator mechanism, and deflects the elastic member by the stepping force received from the pedal;

a sensor that detects a physical quantity related to the swing motion of the pedal; and a connection member that connects the pedal and the stepping force transmission member so that the pedal and the stepping force transmission member move integrally, wherein the housing has an insertion hole through which the connection member is inserted, and wherein the insertion hole has an inner opening end that opens toward an inside of the housing, and wherein the inner opening end faces downward or obliquely downward in a predetermined state in which the pedal device is stored or mounted in the vehicle, and wherein the insertion hole is arranged so that an opening end lower area obtained by extending the inner opening end downward along a predetermined state up-and-down direction, which is an up-and-down direction in the predetermined state, does not overlap with the sensor, a sliding portion where members slide against each other as the pedal swings, and a mechanism-specific portion where members of the reaction force generator mechanism adjacent a gap are displaced against each other as the pedal swings, wherein the connection member is formed so that, regardless of positions of the pedal within a movable range of the pedal, a flow-down portion lower area obtained by extending a flow-down portion of the connection member, which is configured such that water entering the insertion hole is configured to flow downward by gravity from within the insertion hole along the connection member, downward along the predetermined state up-and-down direction does not overlap with the sensor, the sliding portion, and the mechanism-specific portion.

2. The pedal device according to claim 1, wherein the reaction force generator mechanism has a coil spring as the elastic member, and wherein the coil spring corresponds to one of the members of the mechanism-specific portion.

3. The pedal device according to claim 2, wherein the reaction force generator mechanism has a guide portion that restrict a posture of the coil spring while allowing the coil spring to expand and contract.

4. The pedal device according to claim 1, wherein the reaction force generator mechanism includes a coil spring as the elastic member, an outer cylindrical portion, and an inner insertion portion inserted into the outer cylindrical portion, and wherein the outer cylindrical portion and the inner insertion portion slide relative to each other while fitting together as the coil spring expands and contracts, and wherein the coil spring corresponds to the mechanism-specific portion, and wherein the outer cylindrical portion and the inner insertion portion have respective sliding surfaces which corresponds to the sliding portion.

5. The pedal device according to claim 1, further comprising:

a pedal support portion disposed within the housing and supported so as to be able to swing relative to the housing and to rotate integrally with the pedal, and wherein the connection member not only connects the pedal and the stepping force transmission member but also connects the pedal and the pedal support portion, and wherein a portion of the pedal support portion that slides in response to the swing motion of the pedal corresponds to the sliding portion.

6. The pedal device according to claim 1, wherein the stepping force transmission member has a supported portion supported within the housing so as to be able to swing relative to the housing about another axis as a center different from the pedal axis, and wherein the supported portion has a portion which slides in response to the swing motion of the pedal and corresponds to the sliding portion.

7. The pedal device according to claim 1, further comprising:

a link mechanism arranged in the housing to link the connection member and the stepping force transmission member together, wherein the link mechanism has a portion which slides in response to the swing motion of the pedal and corresponds to the sliding portion.

8. The pedal device according to claim 1, wherein the insertion hole is positioned so that the opening end lower area does not overlap with the sensor, the sliding portion, and the mechanism-specific portion regardless of positions of the pedal within a movable range of the pedal.

9. The pedal device according to claim 1, wherein the connection member has an arc-shaped portion that moves in a circumferential direction of the pedal axis while passing through the insertion hole in accordance with swing motion of the pedal, and wherein the arc-shaped portion extends so as to form an arc shape centered on the pedal axis.

10. The pedal device according to claim 9, wherein the arc-shaped portion has a cross-sectional shape on a cross section perpendicular to the arc shape is a shape recessed from one side to the other side in one direction along the cross section.

11. The pedal device according to claim 1, wherein the stepping force transmission member has a widened portion that is widened in an axial direction of the pedal axis more than the reaction force generator mechanism, and wherein the widened portion is positioned within the housing so as to overlap an upper side of the reaction force generator mechanism in the predetermined state up-and-down direction.

12. The pedal device according to claim 1, further comprising:

a widened portion which is configured as a separate component from the stepping force transmission member and is widened in an axial direction of the pedal axis more than the reaction force generator mechanism, wherein the widened portion is fixed to the stepping force transmission member and is positioned within the housing so as to overlap an upper side of the reaction force generator mechanism in the predetermined state up-and-down direction.

13. The pedal device according to claim 1, wherein the stepping force transmission member has a lower arrangement portion arranged to overlap a lower side of the inner opening end, and wherein the lower arrangement portion has inclined surfaces provided on opposite sides to the inner opening end, and wherein the inclined surfaces extend to an end edge of the lower arrangement portion in an axial direction of the pedal axis, and incline so as to be positioned lower as the inclined surfaces approach the end edge.

14. The pedal device according to claim 1, further comprising:

a lower arrangement portion which is configured as a separate component from the stepping force transmission member, is fixed to the stepping force transmission member, and is arranged within the housing so as to overlap a lower side with respect to the inner opening end, wherein the lower arrangement portion has inclined surfaces provided on opposite sides to the inner opening end, and wherein the inclined surfaces extend to an end edge of the lower arrangement portion in an axial direction of the pedal axis, and incline so as to be positioned lower as the inclined surfaces approach the end edge.

15. The pedal device according to claim 1, wherein the housing is formed with a lower communication hole that connects a bottom located on a lower side of a cavity of the housing to an outside of the housing.

16. A pedal device with an organ-type shape to be mounted in a vehicle, comprising:

a housing;

a pedal connected to the housing so as to be able to swing about a pedal axis as a center and positioned to be operated by stepping motion of a driver from a side opposite to the housing;

a reaction force generator mechanism that is disposed within the housing and includes an elastic member that generate a reaction force against a stepping force applied to the pedal by the driver in response to a swing motion of the pedal;

a stepping force transmission member that is disposed within the housing, is connected to the reaction force generator mechanism, and deflects the elastic member by the stepping force received from the pedal;

a sensor that detects a physical quantity related to the swing motion of the pedal, and a connection member that connects the pedal and the stepping force transmission member so that the pedal and the stepping force transmission member move integrally, wherein the housing has an insertion hole through which the connection member is inserted, and wherein the insertion hole has an inner opening end that opens toward an inside of the housing, and wherein the inner opening end faces downward or obliquely downward in a predetermined state in which the pedal device is stored or mounted in the vehicle, and wherein the insertion hole is arranged so that an opening end lower area obtained by extending the inner opening end downward along a predetermined state up-and-down direction, which is an up-and-down direction in the predetermined state, does not overlap with a sensor, a sliding portion where members slide against each other as the pedal swings, and a mechanism-specific portion where members of the reaction force generator mechanism adjacent a gap are displaced against each other as the pedal swings, and wherein the reaction force generator mechanism includes a coil spring as the elastic member, an outer cylindrical portion, and an inner insertion portion inserted into the outer cylindrical portion, and wherein the outer cylindrical portion and the inner insertion portion slide relative to each other while fitting together as the coil spring expands and contracts, and wherein the coil spring corresponds to the mechanism-specific portion, and wherein the outer cylindrical portion and the inner insertion portion have respective sliding surfaces which corresponds to the sliding portion.

17. A pedal device with an organ-type shape to be mounted in a vehicle, comprising:

a housing;

a pedal connected to the housing so as to be able to swing about a pedal axis as a center and positioned to be operated by stepping motion of a driver from a side opposite to the housing;

a reaction force generator mechanism that is disposed within the housing and includes an elastic member that generate a reaction force against a stepping force applied to the pedal by the driver in response to a swing motion of the pedal;

a stepping force transmission member that is disposed within the housing, is connected to the reaction force generator mechanism, and deflects the elastic member by the stepping force received from the pedal;

a sensor that detects a physical quantity related to the swing motion of the pedal, and a connection member that connects the pedal and the stepping force transmission member so that the pedal and the stepping force transmission member move integrally, wherein the housing has an insertion hole through which the connection member is inserted, and wherein the insertion hole has an inner opening end that opens toward an inside of the housing, and wherein the inner opening end faces downward or obliquely downward in a predetermined state in which the pedal device is stored or mounted in the vehicle, and wherein the insertion hole is arranged so that an opening end lower area obtained by extending the inner opening end downward along a predetermined state up-and-down direction, which is an up-and-down direction in the predetermined state, does not overlap with a sensor, a sliding portion where members slide against each other as the pedal swings, and a mechanism-specific portion where members of the reaction force generator mechanism adjacent a gap are displaced against each other as the pedal swings, and further comprising:

a pedal support portion disposed within the housing and supported so as to be able to swing relative to the housing and to rotate integrally with the pedal, and wherein the connection member not only connects the pedal and the stepping force transmission member but also connects the pedal and the pedal support portion, and wherein a portion of the pedal support portion that slides in response to the swing motion of the pedal corresponds to the sliding portion.

18. A pedal device with an organ-type shape to be mounted in a vehicle, comprising:

a housing;

a pedal connected to the housing so as to be able to swing about a pedal axis as a center and positioned to be operated by stepping motion of a driver from a side opposite to the housing;

a reaction force generator mechanism that is disposed within the housing and includes an elastic member that generate a reaction force against a stepping force applied to the pedal by the driver in response to a swing motion of the pedal;

a stepping force transmission member that is disposed within the housing, is connected to the reaction force generator mechanism, and deflects the elastic member by the stepping force received from the pedal;

a sensor that detects a physical quantity related to the swing motion of the pedal, and a connection member that connects the pedal and the stepping force transmission member so that the pedal and the stepping force transmission member move integrally, wherein the housing has an insertion hole through which the connection member is inserted, and wherein the insertion hole has an inner opening end that opens toward an inside of the housing, and wherein the inner opening end faces downward or obliquely downward in a predetermined state in which the pedal device is stored or mounted in the vehicle, and wherein the insertion hole is arranged so that an opening end lower area obtained by extending the inner opening end downward along a predetermined state up-and-down direction, which is an up-and-down direction in the predetermined state, does not overlap with a sensor, a sliding portion where members slide against each other as the pedal swings, and a mechanism-specific portion where members of the reaction force generator mechanism adjacent a gap are displaced against each other as the pedal swings, and wherein the stepping force transmission member has a supported portion supported within the housing so as to be able to swing relative to the housing about another axis as a center different from the pedal axis, and wherein the supported portion has a portion which slides in response to the swing motion of the pedal and corresponds to the sliding portion.

19. The pedal device according to claim 18, further comprising:

a link mechanism arranged in the housing to link members together, wherein the link mechanism has a portion which slides in response to the swing motion of the pedal and corresponds to the sliding portion.

* * * * *